(12) United States Patent
Villagran et al.

(10) Patent No.: US 12,241,855 B2
(45) Date of Patent: Mar. 4, 2025

(54) ELECTROCHEMICAL SENSING OF PFAS USING GOLD NANOPARTICLE FUNCTIONALIZED ELECTRODES

(71) Applicants: Board of Regents, The University of Texas System, Austin, TX (US); Arizona Board of Regents on Behalf of Arizona State University, Phoenix, AZ (US); William Marsh Rice University, Houston, TX (US)

(72) Inventors: Dino Villagran, El Paso, TX (US); Paul Westerhoff, Phoenix, AZ (US); Jonathan Josue Calvillo Solis, El Paso, TX (US); Michael Wong, Houston, TX (US)

(73) Assignees: Board of Regents, The University of Texas System, Austin, TX (US); Arizona Board of Regents on Behalf of Arizon State University, Scottsdale, AZ (US)

( * ) Notice: Subject to any disclaimer, the term of this patent is extended or adjusted under 35 U.S.C. 154(b) by 0 days.

(21) Appl. No.: 18/335,818

(22) Filed: Jun. 15, 2023

(65) Prior Publication Data
US 2023/0408436 A1 Dec. 21, 2023

Related U.S. Application Data

(60) Provisional application No. 63/366,569, filed on Jun. 17, 2022.

(51) Int. Cl.
*G01N 27/30* (2006.01)
*C25D 3/48* (2006.01)
*G01N 27/42* (2006.01)

(52) U.S. Cl.
CPC ........... *G01N 27/308* (2013.01); *C25D 3/48* (2013.01); *G01N 27/42* (2013.01)

(58) Field of Classification Search
CPC ...... G01N 27/308; G01N 27/42; G01N 33/18; G01N 33/1826; G01N 33/184; C25D 3/48
See application file for complete search history.

(56) References Cited

U.S. PATENT DOCUMENTS

2020/0369536 A1* 11/2020 Motkuri ............... A62D 3/40

OTHER PUBLICATIONS

Wyantuti et al., "Chapter—Carbon-Based Electrode Application for Determination and Differentiation of Chromium Ion Species Using Voltammetric Method," from the edited vol. Voltammetry edited by Maxakato et al., published Apr. 26, 2019, DOI: 10.5772/intechopen.85911 (Year: 2019).*

(Continued)

Primary Examiner — Alexander S Noguerola
(74) Attorney, Agent, or Firm — Yee & Associates, P.C.

(57) ABSTRACT

A method of electrochemical sensing includes providing an electrochemical sensor comprising a glassy carbon substrate and gold nanoparticles located on a surface of the glassy carbon substrate; and sensing electrochemically a compound selected from the group consisting of polyfluoroalkyl compounds or perfluoroalkyl compounds using the electrochemical sensor. PFOA quantification was performed by Square Wave Adsorptive Cathodic Stripping Voltammetry (SW-AdCSV) in test solutions with a 100-5,000 ppt concentration. The concentration has a linear relationship with the stripping current within this range. Analysis of tap and groundwater samples performed by additions method demonstrated precision and accuracy above 95%. These electrodes show stability throughout 200 cycles, and reproducibility across similarly prepared but different electrodes above 97.5%. Providing the electrochemical sensor can include providing at least one member selected from the (Continued)

group consisting of perfluoro-1-octanethiol (PFTO), 2,2,2-trifluoroethanethiol (TFET) or perfluorodecanethiol (PFDT) on the surface of the glassy carbon substrate.

16 Claims, 26 Drawing Sheets

(56) References Cited

OTHER PUBLICATIONS

Dai et al., "Anodic Stripping Voltammetry of Arsenic(III) Using Gold Nanoparticle-Modified Electrodes," Anal. Chem. 2004, 76, 5924-5929 (Year: 2004).*
Sahu et al., "Rapid and Direct Perfluorooctanoic Acid Sensing with Selective Ionomer Coatings on Screen-Printed Electrodes under Environmentally Relevant Concentrations," ACS Omega 2022, 7, 5001-5007 ,Published: Feb. 3, 2022 (Year: 2022).*
Achterberg et al., "Stripping voltammetry for the determination of trace metal speciation and in-situ measurements of trace metal distributions in marine waters", Anal. Chim. Acta 400, 1999, pp. 381-397.
Achterberg et al., "Voltammetry—Cathodic Stripping", GEOMAR, Heimholtz Centre for Ocean Research, Kiel, Germany, Elsevier Inc, 2018, 4 pgs.
Ahrens et al., "Stockholm Arlanda Airport as a source of per- and polyfluoroalkyl substances to water, sediment and fish", Chemosphere 129, 2015, pp. 33-38.
Angerstein-Kozlowska et al., "Elementary Steps of Electrochemical Oxidation of Single-Crystal Plauns of Au—I. Chemical Basis of Processes Involving Geometry of Anions and the Electrode Surfaces", Electrochim. Acta, 1996, vol. 31, No. 8, pp. 1051-1061.
Avila et al., "Mechanistic analysis of the cathodic stripping square-wave voltammetric response of the copper-arsenic system at a mercury electrode", Journal of Electroanalytical Chemistry 880, 2021, 114833.
Bard, "Electrode Reactions With Coupled Homogeneous Chemical Reactions", John Wiley & Sons, New York, (2nd ed), 2001.
Benvidi et al., "Electrochemical deposition of gold naonparticles on reduced graphene oxide modified glassy carbon electrode for simultaneous determination of levodopa, uric acid and folic acid", Journal of Electroanalytical Chemistry 736, 2015, pp. 22-29.
Brookes, et al., "Simulation of Square Wave Voltammetry: Reversible Electrode Processes", J. Phys. Chem. B, 1999, vol. 103, pp. 5289-5295.
Calvillo et al., "High Performance of MWCNTs—Chitosan Modified Glassy Carbon Electrode for Voltammetric Trace Analysis of Cd(II)", Int. J. Electrochem. Sci., 2020, vol. 15, pp. 6815-6828.
Ding et al., "Heavy Metals Detection with Paper-Based Electrochemical Sensors", Anal. Chem, 2021, vol. 93, pp. 1880-1888.
Finot et al., "Characterization of electrochemically deposited gold nanocrystals on glassy carbon electrodes", Journal of Electroanalytical Chemistry, 1999, vol. 466, pp. 234-241.
Garay, "Adsorptive square-wave voltammetry of metal complexes. Effect of Ligand Concentration Part III. Theory", Journal of Electroanalytical Chemistry, 2003, vol. 548, pp. 1-9.
Gowda et al., "Electrochemical behavior of paclitaxel and its determination at glassy carbon electrode", Asian Journal of Pharmaceutical Sciences, 2014, vol. 9, pp. 42-49.
Guo et al., "Synthesis and electrochemical applications of gold nanoparticles", Anal. Chim. Acta, 2007, vol. 598, pp. 181-192.
Hara et al., "Electrochemical Biosensors for Detection of Pesticides and Heavy Metal Toxicants in Water: Recent Trends and Progress", ACS EST Water, 2021, vol. 1, pp. 462-478.
Hezard et al., "Influence of the gold nanoparticles electrodeposition method on Hg(II) trace electrochemical detection", Electrochim. Acta, 2012, vol. 73, pp. 15-22.
Hori et al., "Decomposition of Environmentally Persistent Perfluorooctanoic Acid in Water by Photochemical Approaches", Environ. Sci. Technol., 2004, vol. 38, pp. 6118-6124.

Houtz et al., "Oxidative Conversion as a Means of Detecting Precursors to Perfluoroalkyl Acids in Urban Runoff", Environ. Sci. Technol., 2012, vol. 46, pp. 9342-9349.
Hvolbaek et al., "Catalytic activity of Au nanoparticles", Nanotoday, 2007, vol. 2; No. 4, pp. 14-18.
Jahnke et al., "Trace analysis of per-and polyfluorinated alkyl substances in various matrices—How do current methods perform? ", Journal of Chromatography A, 2009, vol. 1216, pp. 410-421.
Kazak et al., "Determination of Cadmium by Cathodic Stripping Voltammetry in the Presence of 4-Phenylthiosemicarbazide", J. Anal. Chem., 2009, vol. 64, pp. 181-184.
Laviron, "General Expression of the Linear Potential Sweep Voltammogram in the Case of Diffusionless Electrochemical Systems", J. Electroanal. Chem., 1979, vol. 101, pp. 19-28.
Li et al., "A sensitive hydrazine electrochemical sensor based on electrodeposition of gold nanoparticles on choline film modified glassy carbon electrode", Sens. Actuators B, 2011, vol. 153, pp. 239-245.
Lin et al., "Glassy carbon electrodes modified with gold nanoparticles for the simultaneous determination of three food antioxidants", Anal. Chim. Acta, 2013, vol. 765, pp. 54-62.
Liu et al., "The Fabrication of Stable Gold Nanoparticle-Modified Interfaces for Electrochemistry", Lagmuir, 2011, vol. 27, pp. 4176-4183.
Liu et al., "Degradation of Perfluorooctanoic Acid with Hydrated Electron by a Heterogeneous Catalytic System", Environ. Sci. Technol., 2022, vol. 56, pp. 6223-6231.
Liu et al., "Fe3+ Promoted the Photocatalytic Defluorination of Perfluorooctanoic Aci (PFOA) over In2O3", ACS EST Water, 2021, vol. 1, pp. 2431-2439.
Luo et al., "Laccase-Catalyzed Degradation of Perfluorooctanoic Acid", Environ. Sci. Technol. Lett., 2015, vol. 2, pp. 198-203.
Mirceski et al., "Differential Square-Wave Voltammetry", Anal. Chem., 2019, vol. 91, pp. 14904-14910.
O'Mullane et al., "Premonolayer Oxidation of Nanostructured Gold: An Important Factor Influencing Electrocatalytic Activity", Langmuir, 2009, vol. 25, pp. 3845-3852.
Onishchenko et al., "Prenatal Exposure to PFOS or PFOA Alters Motor Function in Mice in a Sex-Related Manner", Neurotox Res, 2011, vol. 19, pp. 452-461.
Paiano et al., "Liquid Chromatography-Tandem Mass Spectrometry Analysis of Perfluorooctane Sulfonate and Perfluorooctanoic Acid in Fish Fillet Samples", J Anal Methods Chem., 2012, vol. 1, pp. 1-5.
Park et al., "Fast Cyclic Square-Wave Voltammetry to Enhance Neurotransmitter Selectivity and Sensitivity", Anal. Chem., 2018, vol. 90, pp. 13348-13355.
Perez-Fernandez et al., "Electrochemical (Bio)Sensors for Pesticides Detection Using Screen-Printed Electrodes", Biosens., 2014, vol. 10, pp. 1-26.
Saha et al., "Gold Nanoparticles in Chemical and Biological Sensing", Chem. Rev., 2012, vol. 112, pp. 2739-2779.
Shetty et al., "Rapid and Efficient Removal of Perfluorooctanoic Acid from Water with Fluorine-Rich Calizarene-Based Porous Polymers", ACS Appl. Mater. Interfaces, 2020, vol. 12, pp. 43160-43166.
Silva et al., (1999). Interfacial Electrochemistry: Capacitive and Voltammetric Responses from Stepped Faces of Gold (1st ed.). Routledge. https://www.taylorfrancis.com/chapters/edit/10.1201/9780203750469-25/capacitive-voltammetric-responses-stepped-faces-gold-fernando-silva-ana-martins, Abstract.
Sun et al., "Chemisorption of Perfluorooctanoic Acid on Powdered Activated Carbon Initiated by Persulfate in Aqueous Solution", Environ. Sci. Technol., 2016, vol. 50, 7618-7624.
Suwannakot et al., "Metal-Organic Framework-Enhanced Solid-Phase Microextraction Mass Spectrometry for the Direct and Rapid Detection of Perfluorooctanoic Acid in Environmental Water Samples", Anal. Chem., 2020, vol. 92 pp. 6900-6908.
Wang et al., "Carboxylated carbon nanospheres as solid-phase extraction adsorbents for the determination of perfluorinated compounds in water samples by liquid chromatography-tandem mass spectrometry", Talanta, 2018, vol. 178, pp. 129-133.

(56) References Cited

OTHER PUBLICATIONS

Wang et al., "Strong negative nanocatalysis: oxygen reduction and hydrogen evolution at very small (2 nm) gold nanoparticles", Nanoscale, 2014, vol. 6, pp. 11024-11030.

Wieckowski, A. (1999). Interfacial Electrochemistry: Theory: Experiment, and Applications (1st ed.). Routledge. https://doi.org/10.1201/9780203750469, Abstract.

Ye et al., "Analyzing the anodic stripping square wave voltammetry of heavy metal ions via machine learning: Information beyond a single voltammetric peak", J. Electroanal. Chem., 2020, vol. 872 pp. 113934-113939, https://doi.org/10.1016/j.jelechem.2020.113934.

Zen et al., "Recent Updates of Chemically Modified Electrodes in Analytical Chemistry", Electroanalysis, 2003, vol. 15, pp. 1073-1087.

Zhang et al, "Recent Advances on Electrochemical Sensors for the Detection of Organic Disinfection ByProducts in Water", ACS Sens., 2019, vol. 4, pp. 1138-1150.

Zhou et al. "Selective determination of dopamine and uric acid using electrochemical sensor based on poly(alizarin yellow R) film-modified electrode", Anal. Methods, 2014, vol. 6, pp. 3474-3481.

* cited by examiner

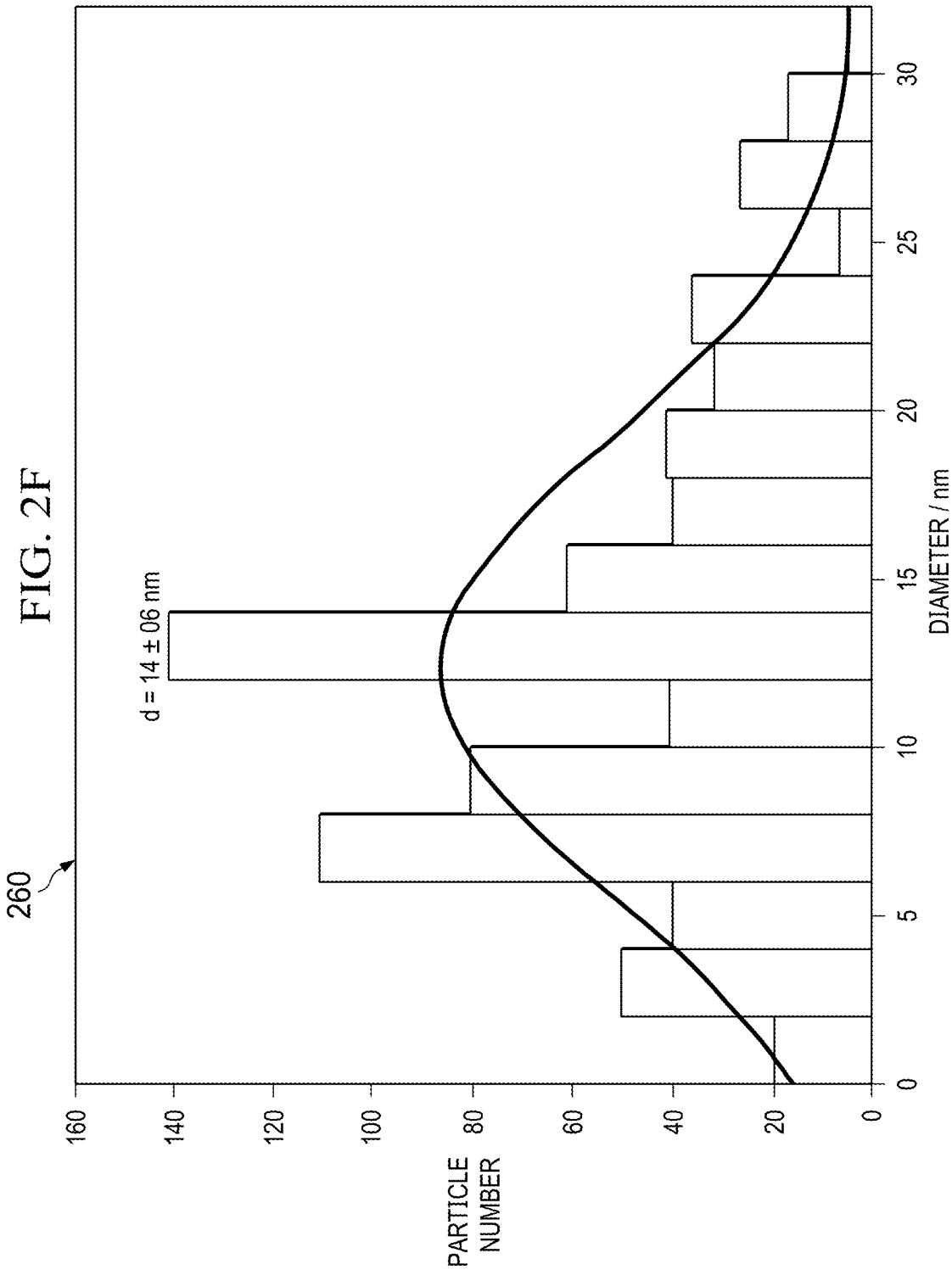

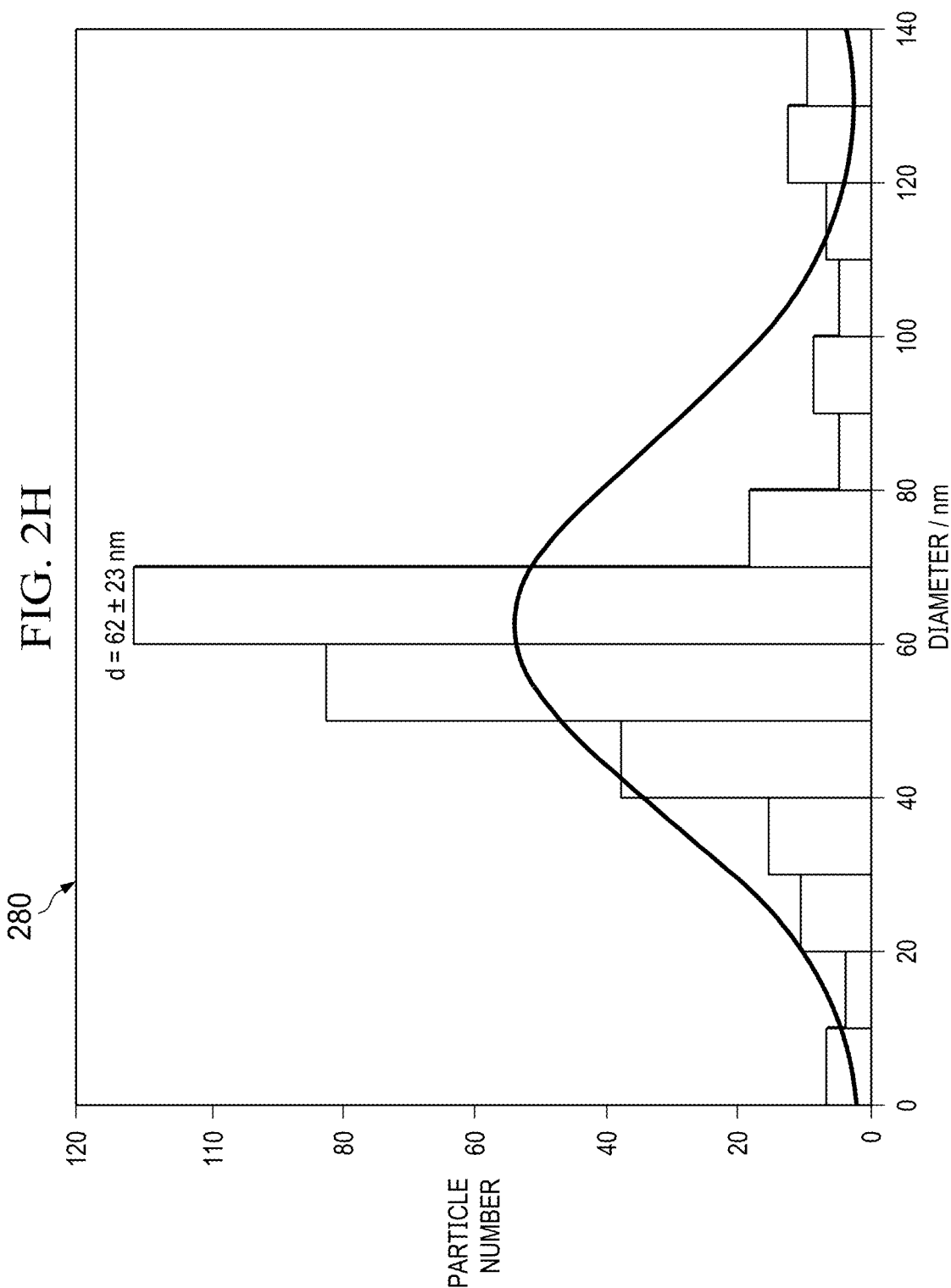

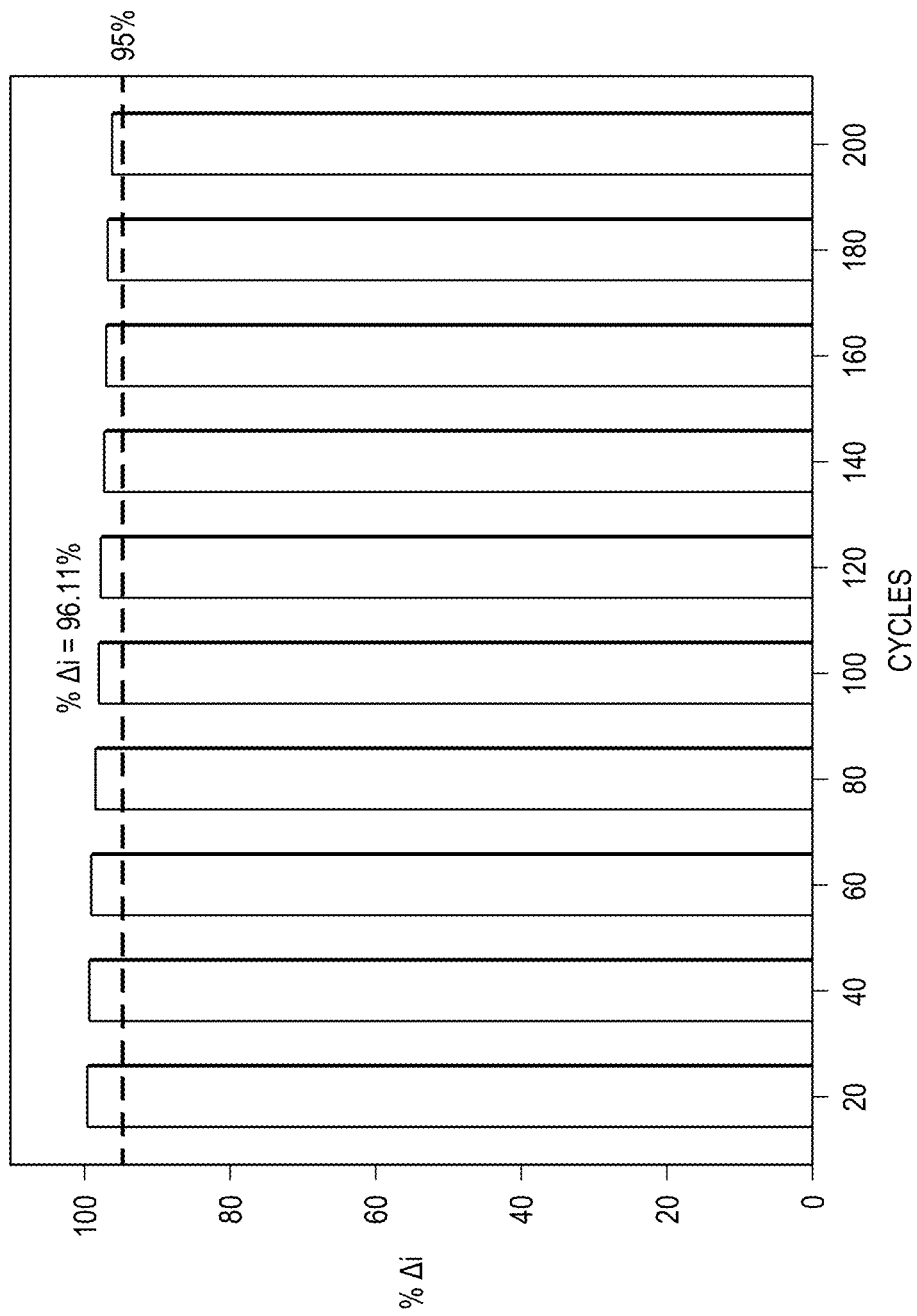

ELECTROCHEMICAL SENSING OF PFAS USING GOLD NANOPARTICLE FUNCTIONALIZED ELECTRODES

CROSS-REFERENCE TO RELATED APPLICATION

This application is a utility conversion and claims priority to U.S. Ser. No. 63/366,569, filed Jun. 17, 2022, the entire contents of which are hereby incorporated herein by reference in their entirety for all purposes.

BACKGROUND

Poly- and perfluoroalkyl compounds (PFAS) are a group of man-made chemicals whose carbon chains are saturated or partially saturated with fluorine atoms. These chemicals have been widely used since 1950 in agriculture, industry, food packaging, and firefighting (among other applications), and they are currently the source of public health concerns due to their high environmental stability (half-life in water >90 years) that leads to bioaccumulation in plants and animals (including humans). Due to their high persistence and stability PFAS have been deemed "forever chemicals". Several studies have reported negative health implications of PFAS exposure including neurotoxic and immunotoxic effects, endocrine disruptive effects, liver damage, and cancer, among other effects.

Referring to FIG. 1, perfluorooctanoic acid 100 (PFOA) is one of the most extensively used PFAS and one of the most pervasive in wastewater, food, and biological matrices. It has been used as a refrigerant and flame retardant at military installations and airports. Its main application is as a surfactant in the emulsion polymerization of fluoropolymers for Teflon synthesis. This is due to the terminal carboxyl group (—COOH) on the perfluorinated chain that gives it amphipathic properties, making it highly soluble in polar and non-polar solvents. It is a relatively strong acid (pKa=3.8) by the large electronegativity difference between the C—F atoms, therefore it will exist completely dissociated as a carboxylate in aqueous solutions at neutral pH. Its 8-carbon extension gives it chemical properties similar to n-octanol, so unlike other PFASs, PFOA shows a high octanol-water partition coefficient ($K_{OW}$), which has been estimated to be 4.81. Therefore, in its neutral form, it has a high affinity for lipid substances and fatty tissues. Consequently, it has high bioaccumulation, bioconcentration, and adsorption in soil and sediments.

Government regulations in most countries are not yet defined, but in the USA the Environmental Protection Agency (EPA) has provided guidelines for PFOA. PFOA continues to persist in the environment and qualitative and (semi)quantitative studies are necessary to detect its presence and concentration. Hence, analytical methods with accuracy and precision are required to determine the concentration of this pollutant, and to monitor that the concentrations do not exceed maximum permissible limits (e.g. 70 ppt (ng $L^{-1}$)). The quantification of PFOA in water samples is mainly performed by liquid chromatography-tandem mass spectrometry (LC-MS/MS), as this technique is required in accredited analytical laboratories. However, the corresponding analysis time is extensive because sample preparation techniques such as liquid-liquid extractions, microextractions, or solid-phase extraction (SPE) are generally required. In addition, the LC-MS/MS equipment is very expensive and constantly employs the use of gasses or solvents.

Electrochemical techniques are an alternative for the PFOA quantification because they offer detection limits in the order of ppb and ppt levels, an acceptable selectivity, the cost per sample analysis is much cheaper and the analysis time is short (5 min or less). Currently, the Adsorptive cathodic stripping voltammetry (AdCSV) is an electrochemical method widely used for these purposes. Is based on a spontaneous adsorption process of the analyte into the surface of the electrode, this step is called preconcentration. Thus, interfacial accumulation in an open circuit without any electrolysis is the main difference between the conventional stripping method. After preconcentration, a staircase potential ramp made by square wave voltammetry is applied from an initial potential to more cathodic values, enough to reduce the analyte. Later is returned to the solution by stripping while recording the measurement of a cathodic current difference ($\Delta i$), which is directly proportional to the concentration. On the other hand, it is easy to determine the $\Delta i$ on the voltammogram because looks like a Gaussian curve and the capacitive current is not recorded.

The sensitivity of this electroanalytical method has been improved by the use of modified electrodes, mainly with nanomaterials capable of electrochemical signal enhancement. Metal nanoparticles (M-NPS) have been widely reported for sensor design. Gold nanoparticles (AuNPs) are one of the most effective nanomaterials because they have electronic and optical properties, and the ease of interacting with the analyte during the preconcentration step due to their high surface-to-volume ratio, as well as high stability when adsorbed films are formed on the surface. Several investigations have reported the improved charge transfer kinetics in a large number of electrochemical systems, therefore, the improvement of the voltammetric signal is observed.

In this study, we present the first electrochemical methodology for PFOA electrosensing by SW-AdCSV (square wave adsorptive cathodic stripping voltammetry) with a glassy carbon electrode modified with electrodeposited AuNPs. An analytical study was carried out to validate the electroanalytical method used and to evaluate its applicability in the analysis of real water samples. Finally, the stability of the sensor and its applicability over time were evaluated.

SUMMARY

Perfluorooctanoic acid (PFOA) is a pollutant of current importance due to its high persistence, bioaccumulation, and potential toxicity. Numerous studies report its presence in water sources, soils, and food at ppb (µg $L^{-1}$) and ppt (ng $L^{-1}$) levels. Here, we describe an electrochemical sensor based on electrodeposited gold nanoparticles (AuNPs) on glassy carbon electrodes with the capacity to detect ppt concentrations of PFOA in aqueous media. AuNPs were electrodeposited via chronoamperometry and they were characterized using Scanning Electronic Microscopy. The AuNPs have an average size of 16±07 nm, and the electrode coverage is 14% which corresponds to a density of 174±07 µm$^{-2}$. PFOA quantification was performed by Square Wave Adsorptive Cathodic Stripping Voltammetry (SW-AdCSV) in test solutions with a 100-5,000 ppt concentration. The concentration has a linear relationship with the stripping current ($R^2$=0.99547) within this range. The limits of detection (LOD) and quantification (LOQ) of this method are 42.3 ppt and 141.2 ppt, respectively. Analysis of tap and groundwater samples performed by additions method demonstrated precision and accuracy above 95%. These electrodes show stability throughout 200 cycles, and reproducibility across similarly prepared but different electrodes above 97.5%.

There is a need for the following embodiments of the present disclosure. Of course, the present disclosure is not limited to these embodiments.

According to an embodiment of the present disclosure, a method of electrochemical sensing comprises providing an electrochemical sensor comprising a glassy carbon substrate and gold nanoparticles located on a surface of the glassy carbon substrate; and sensing electrochemically a compound selected from the group consisting of polyfluoroalkyl compounds or perfluoroalkyl compounds using the electrochemical sensor. Providing the electrochemical sensor can include providing at least one member selected from the group consisting of perfluoro-1-octanethiol (PFTO), 2,2,2-trifluoroethanethiol (TFET) or perfluorodecanethiol (PFDT) on the surface of the glassy carbon substrate.

According to another embodiment of the present disclosure, an article of manufacture comprises an electrochemical sensor comprising a glassy carbon substrate having a surface and a plurality of gold nanoparticles coupled to the surface of the glassy carbon substrate. The article of manufacture can include at least one member selected from the group consisting of perfluoro-1-octanethiol (PFTO), 2,2,2-trifluoroethanethiol (TFET) or perfluorodecanethiol (PFDT) coupled to the surface of the glassy carbon substrate.

According to another embodiment of the present disclosure, a method of making an electrochemical sensor comprises providing a glassy carbon substrate having a surface; and electrodepositing gold nanoparticles on the surface of the glassy carbon substrate. The method of making the electrochemical sensor can include depositing on the surface of the glassy carbon substrate at least one member selected from the group consisting of perfluoro-1-octanethiol (PFTO), 2,2,2-trifluoroethanethiol (TFET) or perfluorodecanethiol (PFDT).

These, and other, embodiments of the present disclosure will be better appreciated and understood when considered in conjunction with the following description and the accompanying drawings. It should be understood, however, that the following description, while indicating various embodiments of the present disclosure and numerous specific details thereof, is given for the purpose of illustration and does not imply limitation. Many substitutions, modifications, additions, and/or rearrangements may be made within the scope of embodiments of the present disclosure, and embodiments of the present disclosure include all such substitutions, modifications, additions, and/or rearrangements.

BRIEF DESCRIPTION OF THE DRAWINGS

The drawings accompanying and forming part of this specification are included to depict certain embodiments of the present disclosure. A clearer concept of the embodiments described in this application will be readily apparent by referring to the exemplary, and therefore nonlimiting, embodiments illustrated in the drawings (wherein identical reference numerals (if they occur in more than one view) designate the same elements). The described embodiments may be better understood by reference to one or more of these drawings in combination with the following description. It should be noted that the features illustrated in the drawings are not necessarily drawn to scale.

FIG. 2A-2H illustrate SEM images of AuNPs/glassy carbon electrodes prepared in 0.1 M $NaNO_3$+0.25 mM $HAuCl_4$ using FIG. 2A) CA: $t_d$=15 s FIG. 2B) CA: $t_d$=3 s FIG. 2C) cyclic voltammetry: N=10 FIG. 2D) cyclic voltammetry: N=4. FIGS. 2E-2H are histograms displaying corresponding nanoparticle size distributions.

FIG. 3A (top) shows voltammogram recorded in a 0.5 M $H_2SO_4$ at v=100 mV s$^{-1}$ and FIG. 3B (bottom) shows anodic stripping of gold in 0.1 HCl by linear sweep voltammetry at v=50 mV s$^{-1}$. $\varphi$=3 mm.

FIGS. 11A-11C illustrate SW-AdCSV response of 1000 ppt PFOA+in 0.1 M KCl (pH 7.0). (a) Variation of $\Delta$i throughout 200 cycles of sensing. (b) Responses of $\Delta$i with 5 different electrodes modified with the same procedure. (c) Effect of the interference species for the PFDT.

DETAILED DESCRIPTION

Figure 1:
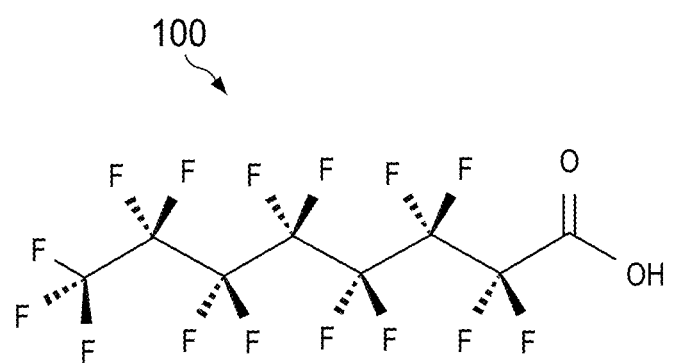
FIG. 1 illustrates a perfluorooctanoic acid (PFOA) structure appropriately labeled prior art.

1. Materials and Methods 1.1. Materials and Apparatus

All chemical reagents were analytical grade. The dilutions for the electroanalytical analysis were prepared using ultrapure water (18 M$\Omega$) and a stock solution of 100.3 µg mL$^{-1}$ perfluorooctanoic acid (PFOA) in methanol from Sigma- Aldrich. The AuNPs electrodeposition was performed in a gold solution prepared with HAuCl$_4$ 1% (w/v) solution (Ricca USA) and NaNO$_3$ (≥99.0%) from Sigma-Aldrich. The H$_2$SO$_4$ (98%) and HCl (37%) used for the activation and characterization were from Fisher Scientific. The effect of pH was performed with phosphate buffer solutions prepared with H$_3$PO$_4$ (98%), NaH$_2$PO$_4$·H$_2$O (≥98%), and Na$_2$HPO$_4$·7H$_2$O (99%), all from Fisher. The acetate buffers were prepared with CH$_3$COOH (99%) and CH$_3$COONa (99%), both reagents from Sigma-Aldrich.

All electrochemical experiments were carried out in an electrochemical cell at 20° C.±2° C. with a three-electrodes arrangement in a CHI760D potentiostat, the working electrode was a glassy carbon disk ($\varphi$=5 mm), and a platinum wire was used as a counter electrode and a saturated calomel electrode (SCE) as a reference electrode. The PFOA solutions were deaerated using N$_2$ gas for 2 minutes before each measurement.

1.2. Electrode Preparation and Modification

The glassy carbon electrodes were carefully polished on a cloth polishing pad for 2 min using 0.3 μm and 0.05 μm alumina slurry. Between each polishing step, the electrodes were washed in DI water for 1 min and in the last step, the electrode was ultrasonicated for 5 min in DI water, ethanol, and acetone. The electrode was dried under an N$_2$ atmosphere for 1 min.

AuNPs were deposited onto the glassy carbon surface using cyclic voltammetry (CV) and chronoamperometry (CA) methods in a work solution of 0.1 M NaNO$_3$+0.25 mM HAuCl$_4$. The experimental conditions were chosen to optimize NP diameter and density.

Electrodeposition by chronoamperometry was made by applying a deposition potential (E$_d$) of −0.044 V for a time deposition (t$_d$) of 3 s and 15 s. The modification by cyclic voltammetry was performed with several cycles (N) of 4 and 10 in a window potential from 1V to −0.2 V vs saturated calomel electrode. Subsequently, the electrodes were subjected to ultrasound in DI water for 2 minutes to remove physisorbed AuNPs to form a strong stable nanoparticle layer. Thereby all glassy carbon modified electrodes were activated in a 0.5 M H$_2$SO$_4$ solution by running 10 scans between 0.6 V to 1.5 V vs. saturated calomel electrode (anodic direction) at v=100 mV s$^{-1}$.

1.3. AuNPs/Glassy Carbon Electrodes Characterization

The AuNP electrodeposits were characterized using glassy carbon disks ($\varphi$=5 mm) which were observed in a Hitachi S-4800 scanning electronic microscope (SEM) operated at 15 kV. The distribution and average size of the nanoparticles were calculated using ImageJ image processing toolbox software, counting the maximum number of AuNPs in every micrograph (depending on stripping charge). AuNPs density was determined by the proportion of the number of nanoparticles (N) over the electrode area (A) expressed in um$^2$.

2. Results and Discussion

2.1.1. Surface Characterization by SEM

SEM analysis was performed to characterize the size and density of electrodeposits on the glassy carbon surface by cyclic voltammetry and CA. FIGS. 2A-2H show the formation and distribution of AuNPs under different conditions and Table 1 shows the summary and other characterization parameters.

Figure 2A:
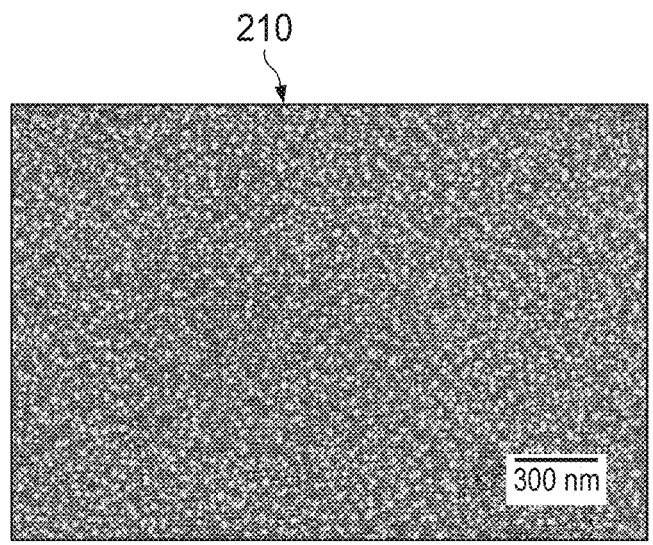
Figure 2B:
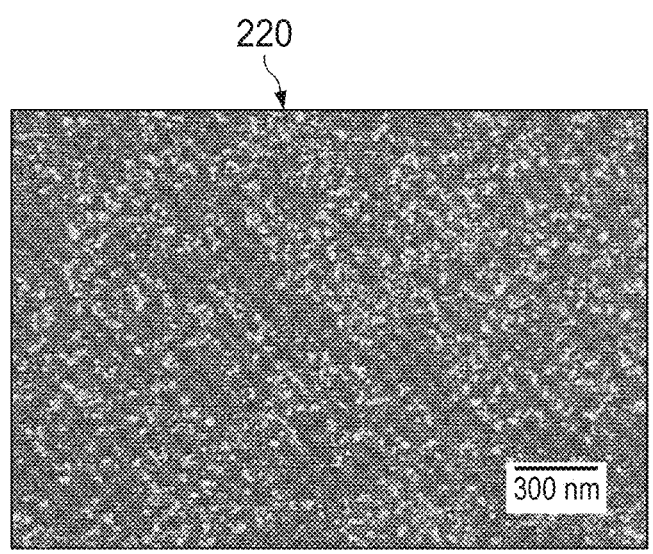
Figure 2C:
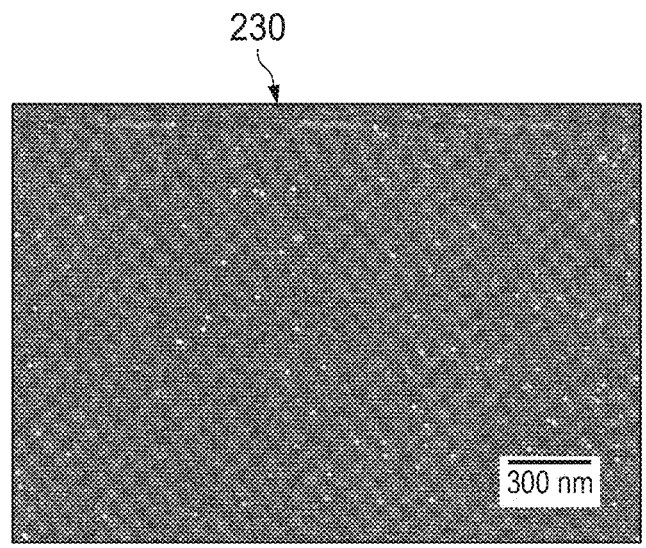
Figure 2D:
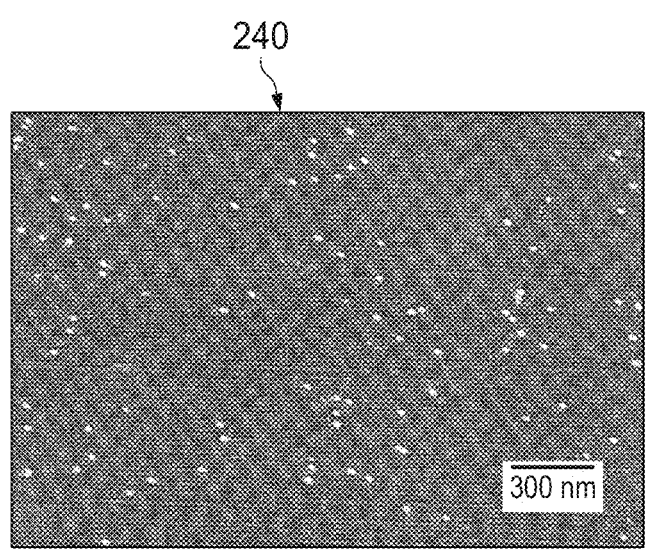
Figure 2E:
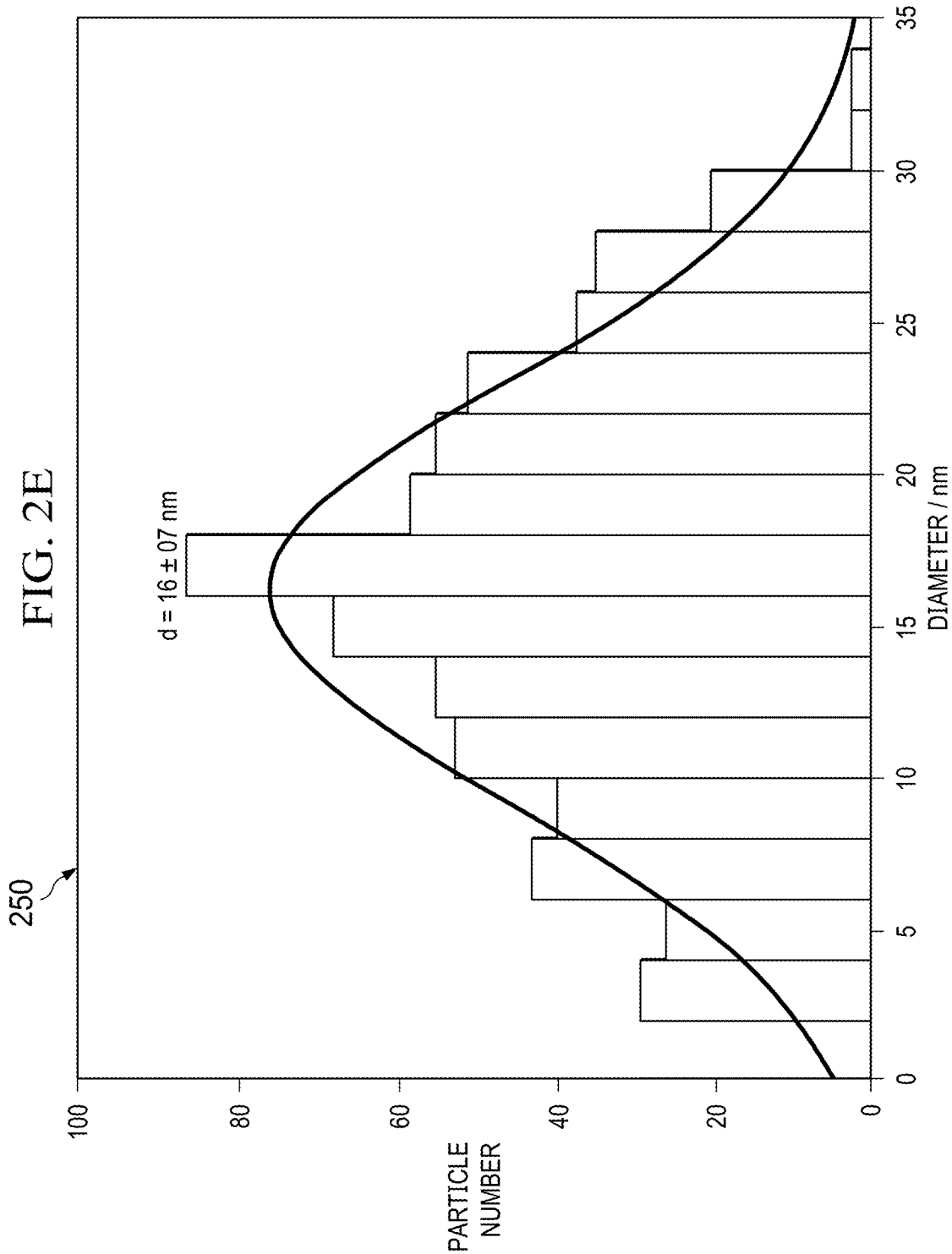
Figure 2G:
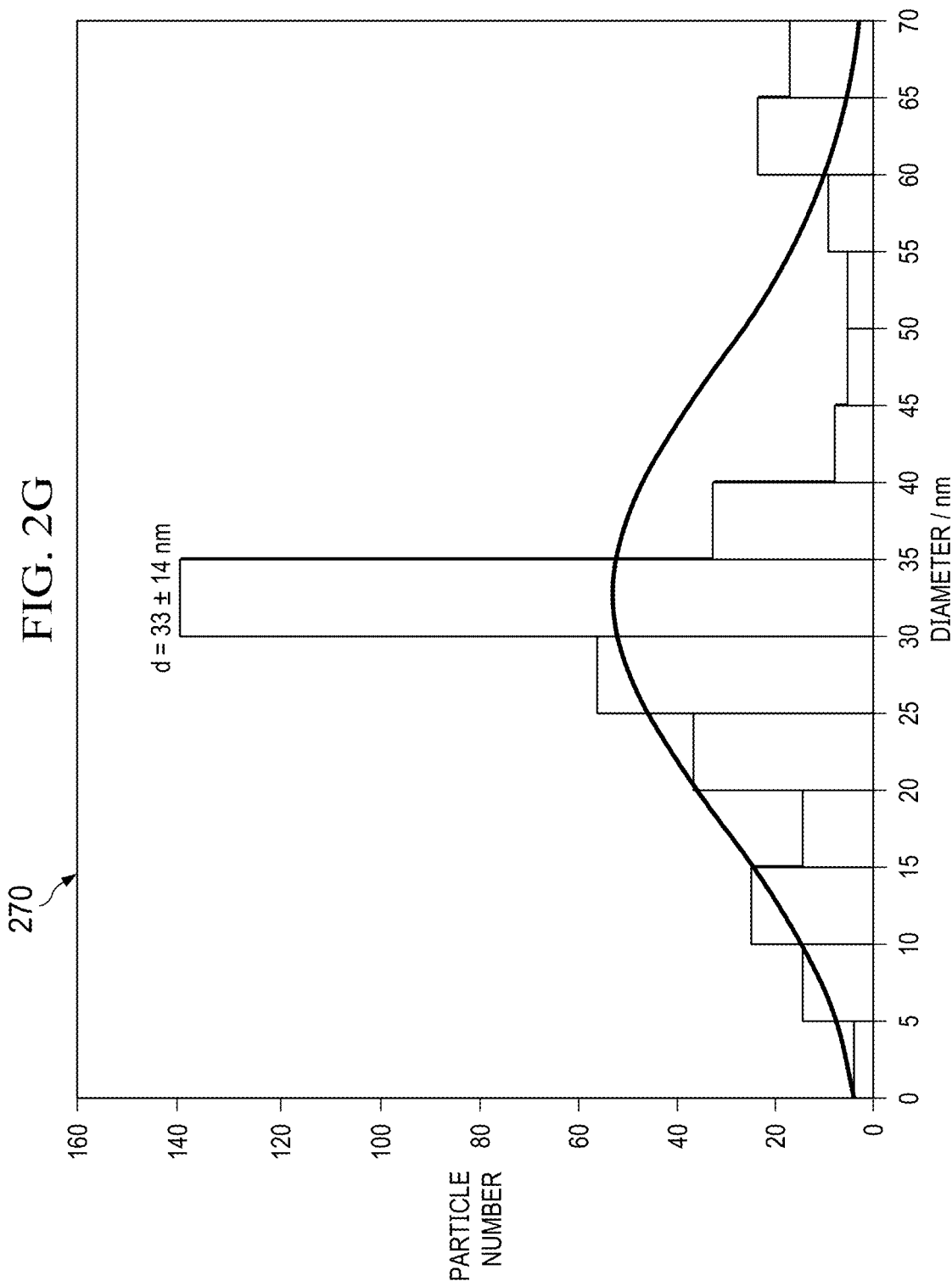

FIG. 2A shows a first formation 210. FIG. 2B shows a second formation 220. FIG. 2C shows a first formation 230. FIG. 2D shows a first formation 240. FIG. 2E shows a first particle size distribution 250. FIG. 2F shows a second particle size distribution 260. FIG. 2G shows a third particle size distribution 270. FIG. 2H shows a first particle size distribution 280.

As shown in FIG. 2A, by chronoamperometry at t$_d$=15 s, homogeneous electrodeposits with broad coverage, minimal agglomeration, and hemispherical shape were obtained. Nanoparticles were (d=16 nm±07 nm), Moreover, the best AuNPs density (174±07 μm$^{-2}$) was obtained. At 3 s td (FIG. 2B), the smallest nanoparticles were obtained (d=14 nm±06 nm), however, the NPs density is lower than in electrode A and multiple nucleation sites were observed on the surface possibly due to the short time of electrolysis.

Significant differences were observed in the cyclic voltammetry modified electrodes (FIGS. 2C and 2D) as both the sizes of AuNPs were larger and the coverage was lower. These differences in morphology and coverage depend on the Q$_{Au(III)}$ electrodeposition charge since for both CA-modified electrodes a charge of 30-75 μC is recorded while by cyclic voltammetry a charge of 260-445 μC was recorded. Both techniques electrodeposit NPs on the electrode surface in different ways, by chronoamperometry there is better control in the growth of the NPs due to the imposition of a deposition potential (E$_d$), which favors monodispersion and avoids agglomeration because the cathodic reaction is continuous during the whole deposition time. In addition, the agitation of the solution contributes to mass transport so that a more uniform coating and a wider distribution of AuNPs are achieved. By cyclic voltammetry, a potential sweep is imposed in a certain window in which the electrodeposition happens when the cathodic peak potential (Epc) is reached, at this point the reduction of Au(III) to Au(0) is thermodynamically and kinetically favorable, so a large amount of Au$^{3+}$ ions is reduced, this is why a higher charge was recorded. Consequently, a large amount of AuNPs is formed but in a short period, which possibly does not allow the formation of small NPs and favors nucleation. After the peak potential, a current drop is recorded in the voltammograms where there is a diffusional control regime, in this step, there is the overlapping of the diffusion layers which probably interferes with the monodispersion of AuNPs.

2.1.2. Electrochemical Characterization

Figure 3A:
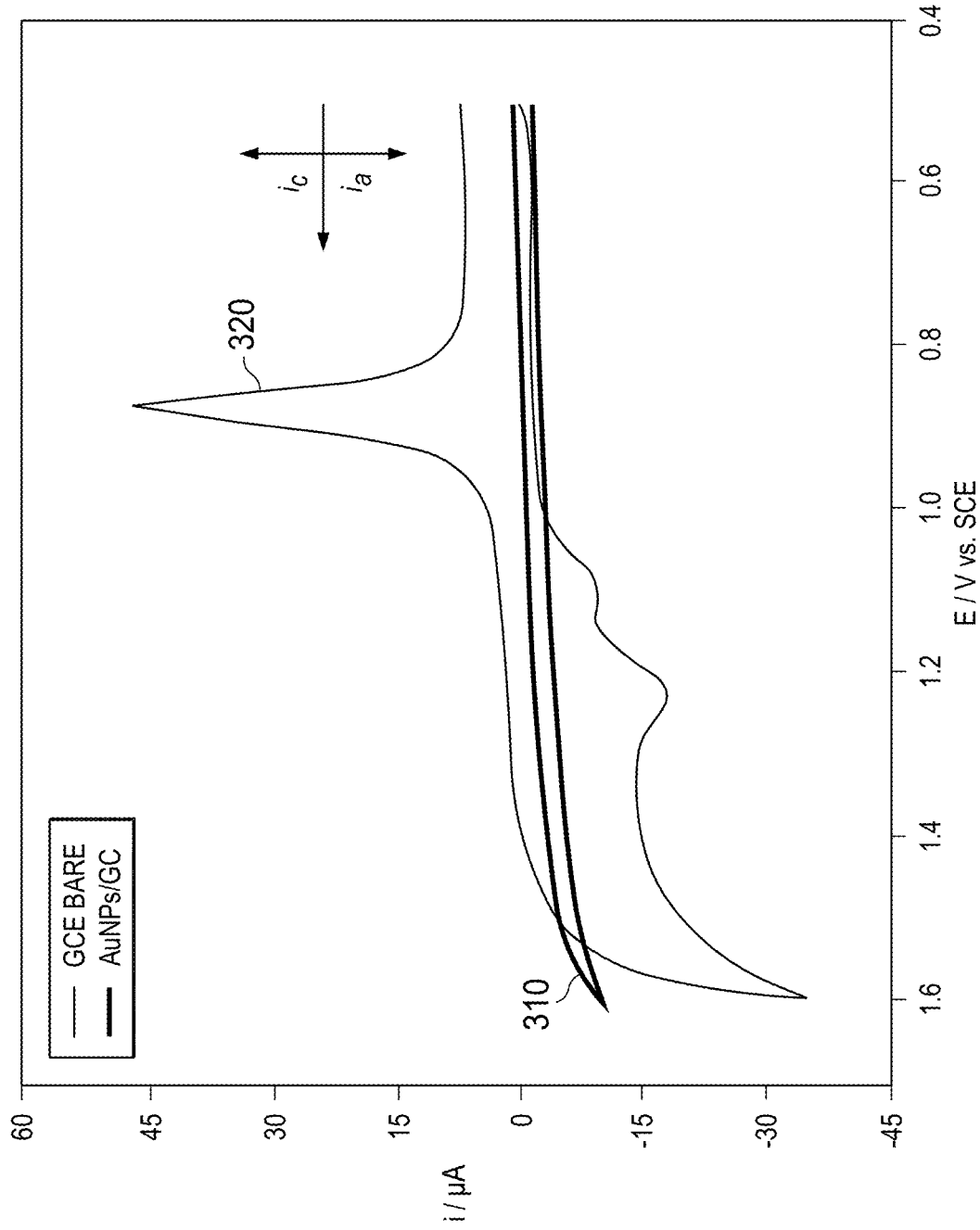
FIG. 3A-3B illustrate electrochemical characterization of the AuNPs/glassy carbon electrode.

The electrochemical characterization was made by cyclic voltammetry in a 0.5 M H$_2$SO$_4$ solution under anaerobic conditions. FIG. 3A shows the voltammogram by glassy carbon electrode bare 310 presenting no redox signals under these conditions, therefore no other reactions interfere in the characterization. The voltammogram by AuNPs/glassy carbon electrode 320 shows an anodic peak between 1.0 V and 1.2 V vs. saturated calomel electrode, corresponding to the formation of different types of crystalline gold oxides (mainly AuO) according to the following reactions.

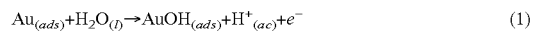

In the reverse scan a cathodic peak was observed at 0.87 V vs. saturated calomel electrode, which were related to the reduction of gold oxides to produce Au(0).

Figure 3B:
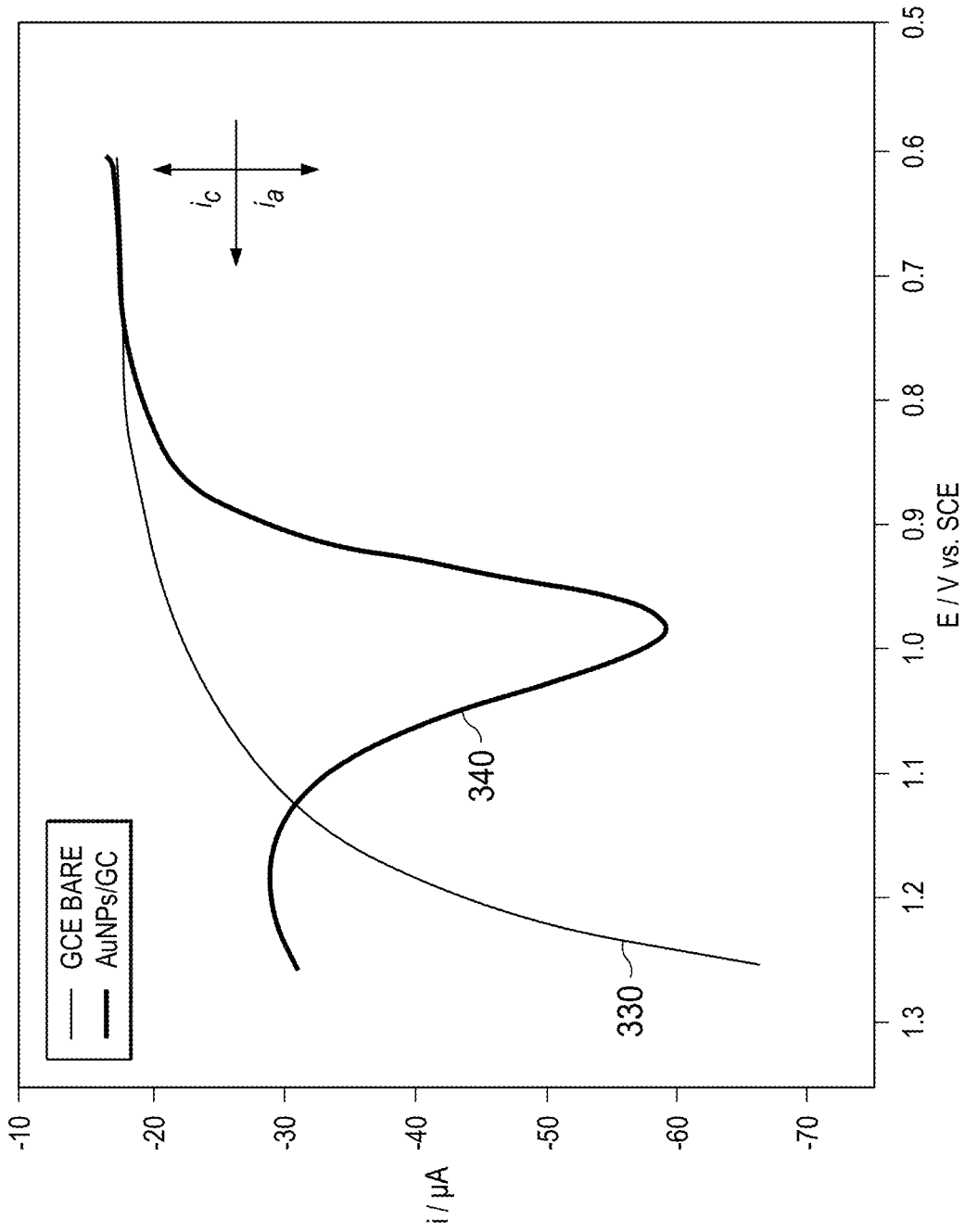

FIG. 3B shows a voltammogram by glassy carbon electrode bare 330 and a voltammogram by AuNPs/GC 340. The number of electrodeposited nanoparticles (N) on the electrode surface was estimated by the anodic stripping charge (Q) of AuNPs in 0.1 M HCl solution by linear sweep voltammetry in FIG. 3B. In this system with high chloride ions concentration, the oxidized gold atoms form coordination complexes as products of the anodic reaction. According to the morphology observed in the SEM micrographs, a spherical shape was considered, therefore, N can be determined based on the charge (Q) and the average radius (r) of the nanoparticles according to the following equation.

$$N = Q \times \frac{M_{Au}}{1.9e\frac{4}{3}\pi r^3 \rho_{Au} N_A}$$

where e is the elemental charge, $\rho_{Au}$ is the density of gold (19.32 g cm$^{-3}$), $M_{Au}$ is the atomic weight of gold and $N_A$ is the Avogadro constant. Subsequently, with N it is possible to calculate the coverage of the electrode modified with AuNPs ($\theta$) with the following equation.

$$\theta = 100 \times \frac{\pi r^2 N}{A}$$

Table 1 shows the results of the electrochemical and SEM characterization.TT an $Ep_c$ of −1.26 V and the highest $ip_c$ which increased by a ratio close to two with respect to the Au electrode. The above evidenced the kinetic effect of AuNPs during electron transfer, whereby gold in nanometer form is better than gold macroelectrode in detecting lower concentrations of PFOA.

Figure 5A:
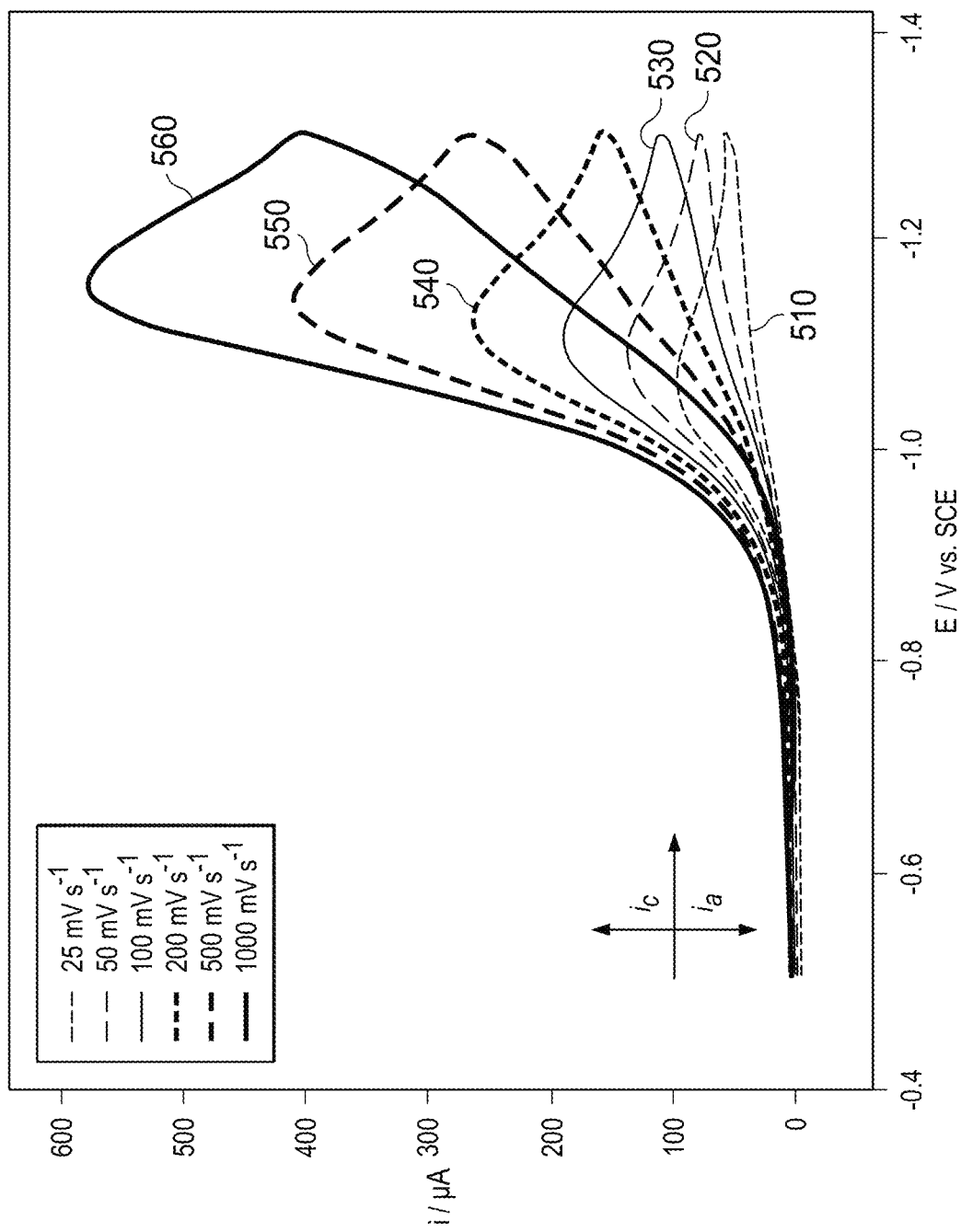
FIGS. 5A-5B illustrate scan rate effect of 1 mM PFOA+ 0.1 M acetate buffer (pH 5) of AuNPs/glassy carbon electrode prepared by chronoamperometry using $t_d$=15 s, $E_d$=-0.044 V vs. saturated calomel electrode FIG. 5A) voltammograms of 25 mV s$^{-1}$-1000 mV s$^{-1}$ FIG. 5B) ip vs $v^{1/2}$ FIG. 5C) log v vs log ip FIG. 5D) Ep vs log v. $\varphi$=3 mm.
Figure 5B:
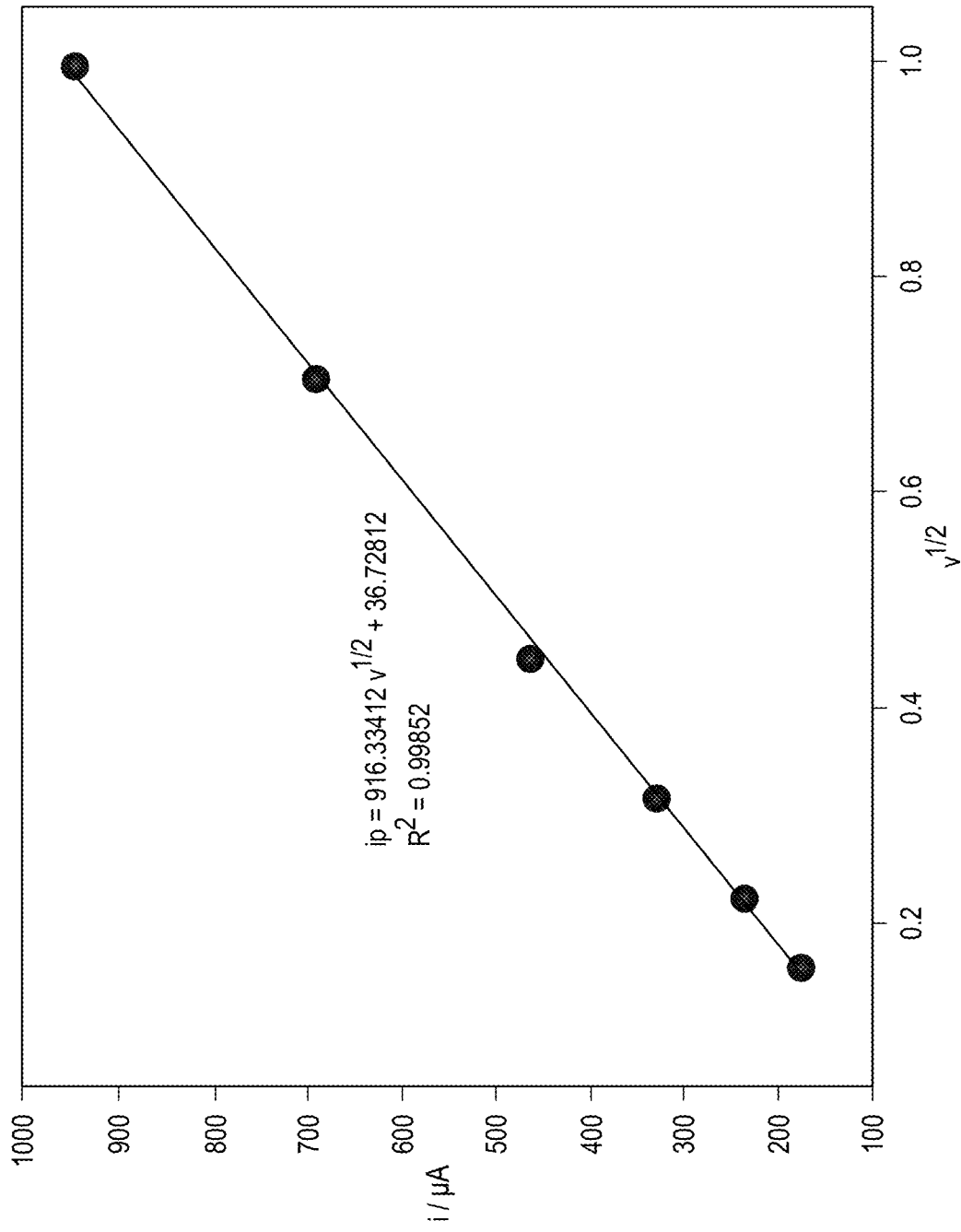
Figure 5C:
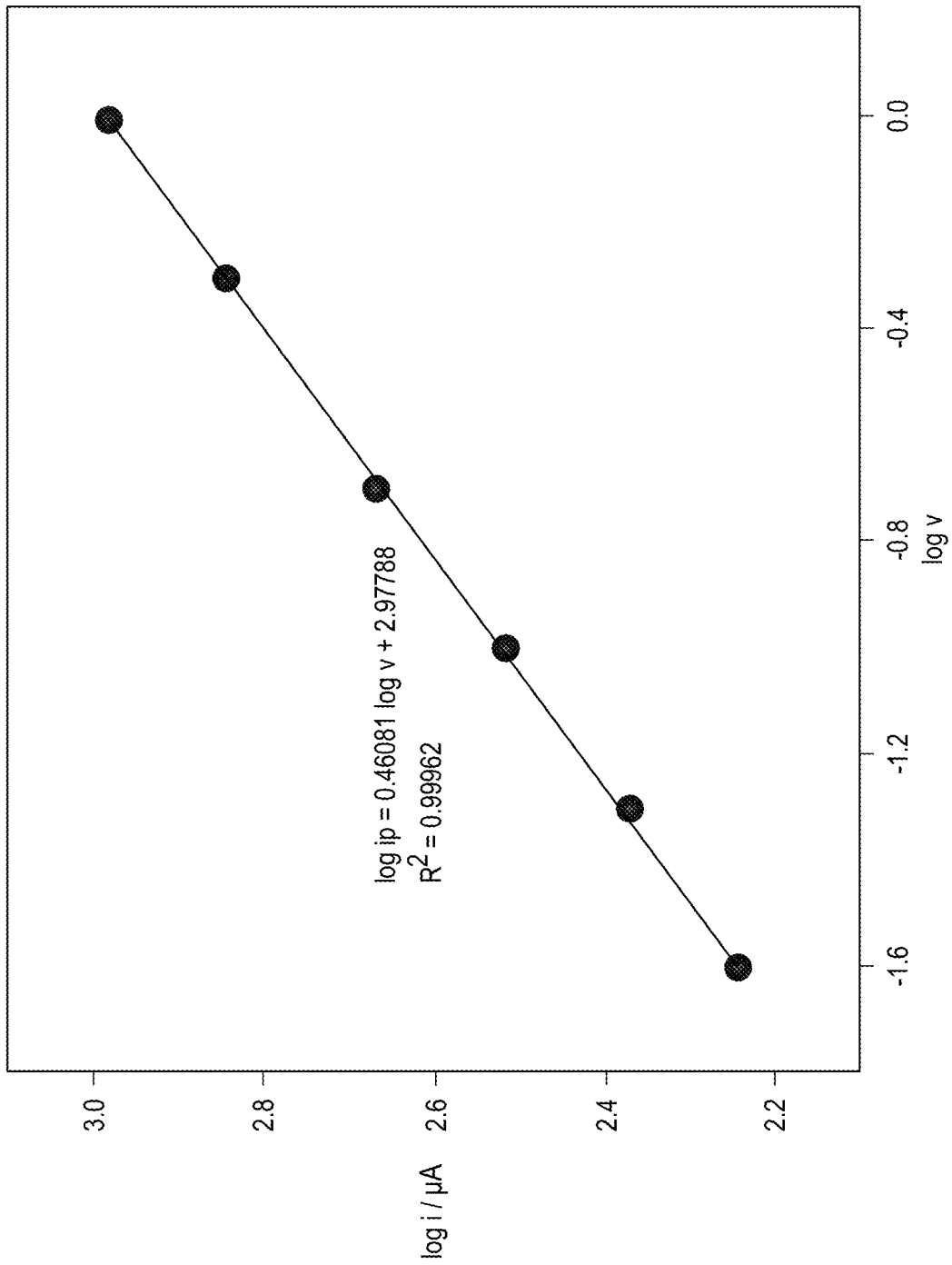
Figure 5D:
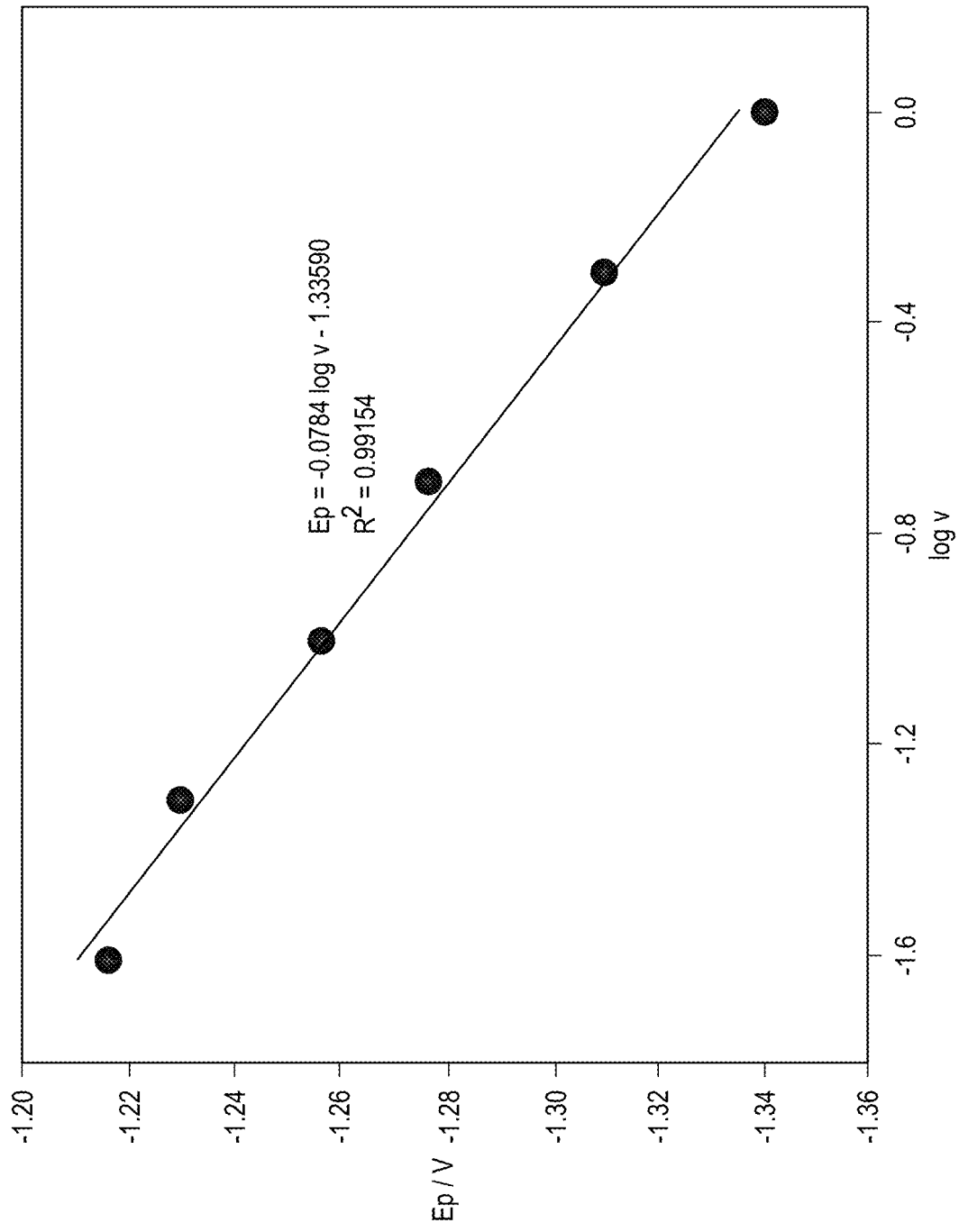

The effect of the scan rate (v) for the cathodic reduction of 1 mM PFOA+0.1 M ABS with the AuNPs/glassy carbon electrode was studied in a range from 25 mV s$^{-1}$ to 1000 m V s$^{-1}$. FIG. 5A shows 25 mV s$^{-1}$ 510, 50 mV s$^{-1}$ 520, 100 mV s$^{-1}$ 530, 200 mV s$^{-1}$ 540, 500 mV s$^{-1}$ 550, and 1000 m V s$^{-1}$ 560. The $ip_c$ increased as the v increased furthermore, a shift of $Ep_c$ towards more negative potentials was observed which confirmed the irreversibility of the cathodic process. The $ip_c$ was directly proportional to v$^{1/2}$ (FIG. 5B) according to the Randles-Sevcik equation for an electrochemically irreversible system, therefore it was determined that the mass transport mechanism is diffusion-controlled. The foregoing was confirmed by the plot of log ip vs log v (FIG. 5C) since the slope of the equation of the line had a value close to 0.5, for a diffusional control. The variation of $Ep_c$ with respect to log v was directly proportional (FIG. 5D).

The above data indicated the possibility that there are coupled chemical reactions involved within the cathodic reduction mechanism, thus possibly an E-C mechanism with multiple chemicals (C) and charge transfer (E) reactions. Therefore, the number of electrons involved in the cathodic process was determined based on the Laviron theory.

TABLE 1

Characterization of AuNPs modified glassy carbon electrodes with different methods.

| Electrode | Method | $t_d$ | QAu(III) (μC)$^a$ | Q (μC)$^b$ | NPs density (μm$^{-2}$)$^c$ | d (nm)$^c$ | N | θ | Δi (μA)$^d$ |
|---|---|---|---|---|---|---|---|---|---|
| A | CA | 15 s | 124.5 | 1059.1 | 175 ± 08 | 16 ± 07 (660) | 3.43 × 10$^9$ | 14.1% ± 0.7 | 489.1 ± 7.82 |
| B | CA | 3 s Cycles | 53.1 | 613.8 | 151 ± 07 | 14 ± 06 (729) | 2.97 × 10$^9$ | 9.32% ± 0.5 | 421.4 ± 8.01 |
| C | CV | N = 10 | 771.9 | 554.6 | 100 ± 01 | 33 ± 14 (380) | 2.05 × 10$^8$ | 3.57% ± 0.1 | 409.5 ± 9.41 |
| D | CV | N = 4 | 436.6 | 827.1 | 23 ± 01 | 62 ± 23 (319) | 4.61 × 10$^7$ | 2.35% ± 0.1 | 401.7 ± 4.05 |

$^a$Q$_{Au(III)}$ is the charge consumed in the electrochemical reduction step in 0.1M NaNO$_3$ + 0.25 mM HAuCl$_4$.
$^b$Q is the anodic stripping charge of Au-NPs Q obtained by integrating the area under the curve of the LS voltammograms.
$^c$NPs density estimation. Values in parentheses indicate the number of nanoparticles measured for the calculation.
$^d$Δi is the stripping peak of SW-AdCSV 5000 ppt PFOA + 0.1M acetate buffer solution pH 5.

2.2. Electrochemical Behavior of PFOA on AuNPs/Glassy Carbon Electrode

2.2.1. Cyclic Voltammetry Study

Figure 4:
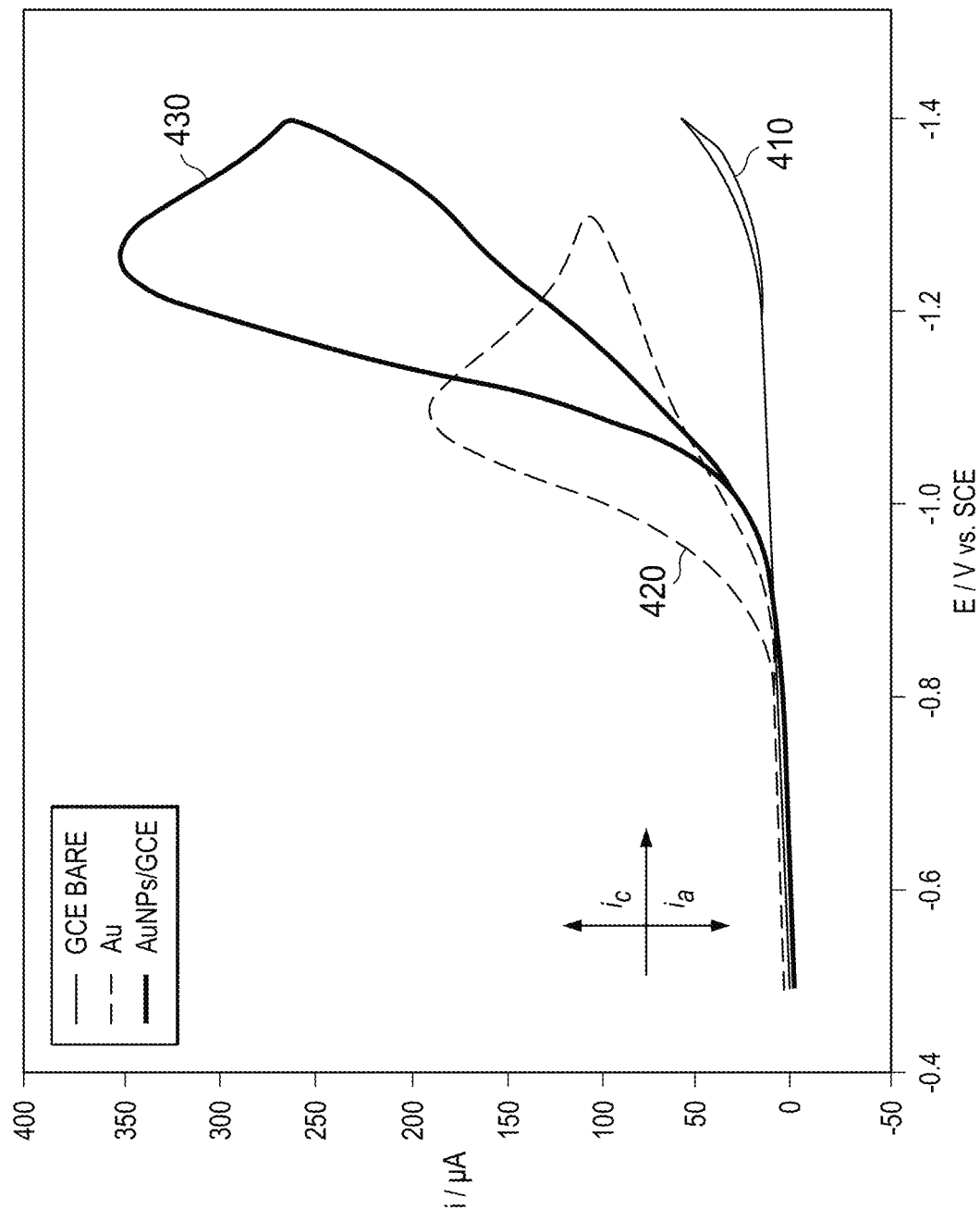
FIG. 4 illustrates cyclic voltammetry of 1 mM PFOA+0.1 M ABS pH 5 for glassy carbon electrode bare (black line), Au (red line), and AuNPs/glassy carbon electrode (blue line) prepared by chronoamperometry using $t_d$=15 s, $E_D$=-0.044 V vs. saturated calomel electrode v=100 mV s$^{-1}$, $\varphi$=3 mm.

The redox behavior of PFOA in the cathodic direction was studied in the glassy carbon bare, Au, and AuNPs/glassy carbon electrodes. FIG. 4 shows data for GCE bare 410, data for Au 420, and data for AuNPs/GCE 430. PFOA shows an electrochemically irreversible cathodic reduction, such behavior is maintained in all electrodes. Significant differences in cathodic peak potential ($Ep_c$) and cathodic peak current ($ip_c$) were observed. The $Ep_c$ is −1.1 V for the gold electrode, while for the glassy carbon electrode bare is not observed a peak in the acetate buffer window potential, indicating that the redox reaction is thermodynamically and kinetically more favorable when is carried out on a gold surface. Subsequently, the response with gold nano-surface was evaluated. The AuNPs/glassy carbon electrode showed $$E_p = E^\circ + \frac{2.303RT}{\alpha nF}\log\left(\frac{RTk_S}{\alpha nF}\right) + \left(\frac{2.303RT}{\alpha nF}\right)\log v$$

where $E^{\circ'}$ is the formal potential, α is the transfer coefficient, $k_s$ the electronic transfer constant (s$^{-1}$) and n the number of electrons. From the slope value, αn=0.7416 was determined. To calculate α with the equation.

$$|E_p - E_{p/2}| = \frac{1.15RT}{\alpha F}$$

From the voltammograms obtained at different scan rates, the value of half-peak potential ($E_{p/2}$) was determined, with which it was possible to determine the following data shown in Table 2, as well as a comparison of the data obtained for Au electrode performed using the same method described previously.

TABLE 2

Voltammetric data for cathodic reduction of
1 mM PFOA in 0.1M Acetate buffer (pH 5).

| Electrode | E°' | α | $n_{app}$ | $k_s$ |
|---|---|---|---|---|
| Au | −1.158 V | 0.2849 | 4 | 4132.26 s$^{-1}$ |
| AuNPs/GCE | −1.335 V | 0.2874 | 4 | 6970.03 s$^{-1}$ |

The difference between the electronic transfer constants showed the clear catalytic effect of the AuNPs in the cathodic reduction of PFOA, on the other hand, the reduction of E°' evidenced the synergistic effect in the thermodynamics of the reaction, which was revealed by a smaller a value characterizing the symmetry of the energy barrier of the redox reaction.

2.2.2. Square Wave Adsorptive Cathodic Stripping Voltammetry

Figure 6:
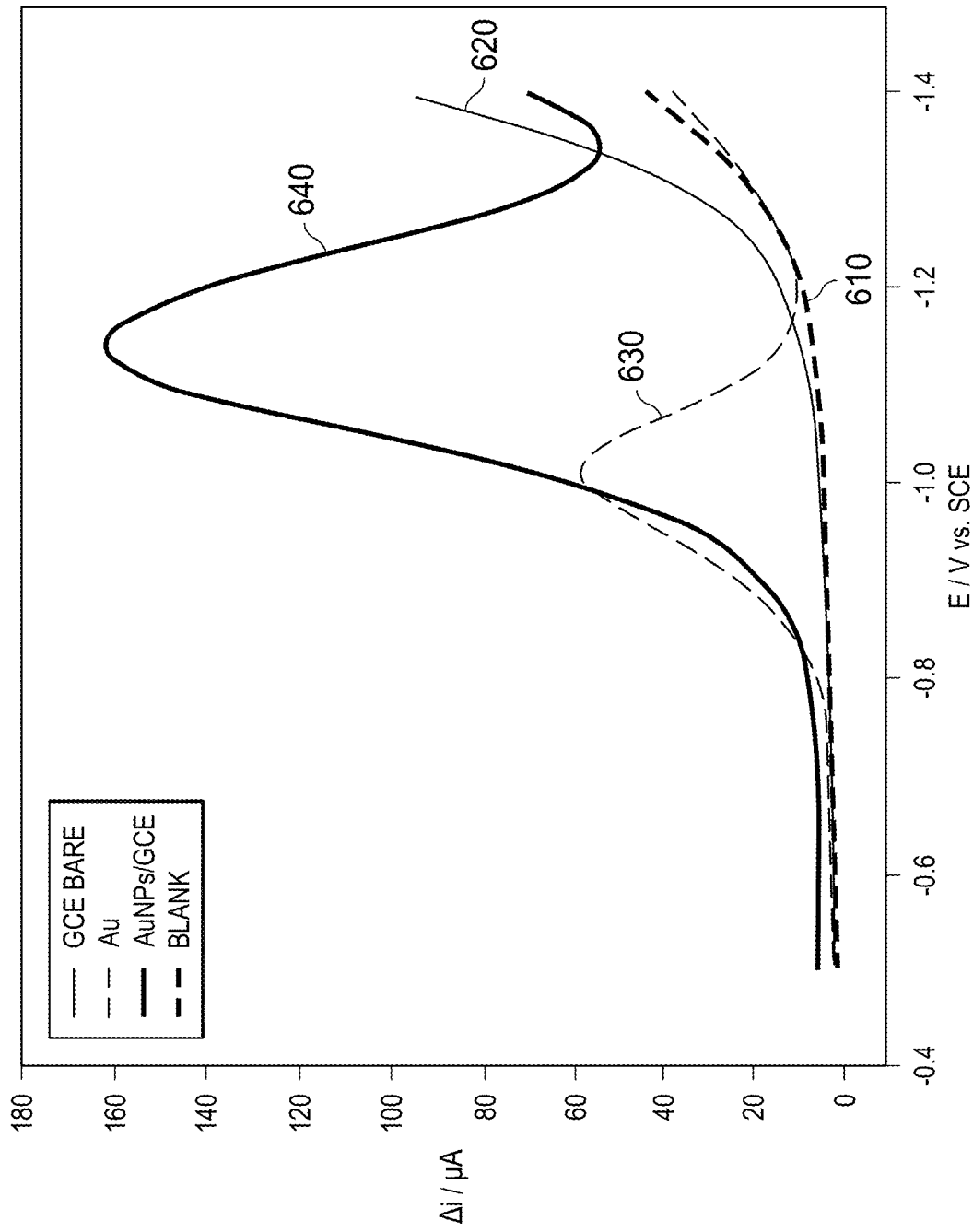
FIG. 6 illustrates SW-AdSV of 500 ppt PFOA+0.1 M acetate buffer (pH 5) for glassy carbon electrode bare (red line), Au (blue line), AuNPs/glassy carbon electrode (green line) prepared by chronoamperometry using $t_d$=15 s, $E_d$=-0.044 V vs. saturated calomel electrode f=20 Hz, $E_{step}$=25 mV, $E_{sw}$=5 mV, $t_{dep}$=45 s. $\varphi$=5 mm.

An evaluation of AuNPs/glassy carbon electrode in a 500 ppt PFOA solution in 0.1 M ABS (pH 5) was performed to study the voltammetric response in ppt levels. FIG. 6 shows cyclic voltammetry data for blank 610, data for GCE bare 620, data for Au 630, and data for AuNPs/GCE 640. As seen in FIG. 6, with the bare glassy carbon electrode no peaks were observed, as obtained by cyclic voltammetry. The gold electrode recorded a peak at a potential of −1 V, which was defined with a Δi=58 μA. However, the AuNPs/glassy carbon electrode showed a peak with a higher current (Δi=161 μA) at a potential of −1.15 V. Therefore, it is possible to detect lower concentrations of PFOA with the nanostructured electrode. This is due to the increased surface area, which favors the adsorption of PFOA during the preconcentration step.

2.3. Calibration Curve

Figure 7A:
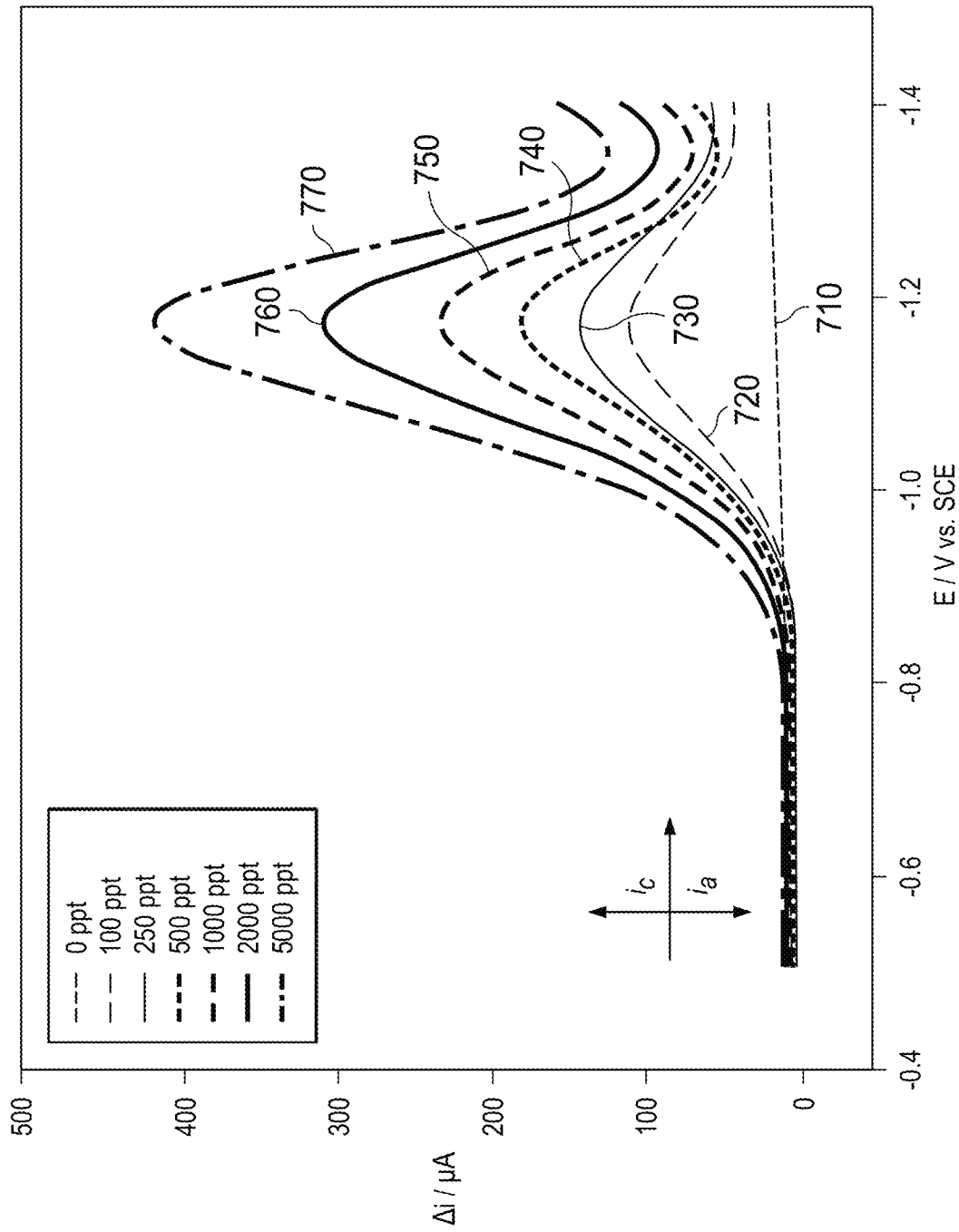
FIGS. 7A-7B illustrate SW-AdCSV of AuNPs/glassy carbon electrode FIG. 6A) effect of the concentration in the $\Delta$i FIG. 6B) calibration curve in a range of 100-5000 ppt. f=20 Hz, $E_{step}$=25 mV, $E_{sw}$=5 mV, $t_{dep}$=45 s. $\varphi$=5 mm.

A calibration curve was performed to evaluate the relation between the stripping current (Δi) and the PFOA concentration in a range of 100-5000 ppb by SW-AdCSV in 0.1 M ABS pH 5. FIG. 7A shows data for 0 ppt 710, 100 ppt 720, 250 ppt 730, 500 ppt 740, 1000 ppt 750, 2000 ppt 760, and 5000 ppt 770. Good linearity was obtained by the $R^2$=0.99547, the equation of the linear regression as shown in FIG. 5B. The limits of detection (LOD) and quantification (LOQ) were calculated according to the following equations.

$$LOD = \frac{3\sigma}{m}; LOQ = \frac{10\sigma}{m}$$

where σ is the standard deviation of the electrolyte support (without PFOA) and m is the slope of the equation of the line. The LOD and LOQ were 42.3 ppt and 141.2 ppt respectively, these results show a competitive advantage in comparison with other analytical techniques such as liquid chromatography-tandem mass spectrometry (LC-MS/MS) and high-performance liquid chromatography (HPLC-MS/MS), of which LODs in a range of 25-100 ppt have been reported.

In addition, the AuNPs/glassy carbon electrode showed better sensitivity than a photoluminescence (PL) sensor or electrochemiluminescence (ECL) sensor. This showed the competitiveness of the SWCSV using the AuNPs/glassy carbon electrode in comparison with other analytical techniques to perform the PFOA sensing.

2.4. Validation of the Analytical Method

The AuNPs/GC electrode was evaluated to determine its applicability in several samples of tap water by the addition method. The samples analyzed only add them 0.1 M ABS (pH 5) therefore no pre-concentration treatment was applied (Table 3). In all of these cases, the PFAS concentration was below the LOD. The additions of 500 and 1000 ppt on tap water were very close to real concentration according to the recovery percentages and all values were inside of 100±5% and the relative standard deviation (RSD) was less than 5%. These results demonstrated the precision and accuracy of this method, for this reason, the AuNPs/glassy carbon electrode is viable for sensing PFOA in real water samples.

TABLE 3

Recovery data for PFOA addition in tap water
samples using AuNPs/glassy carbon electrode.

| Sample (PFOA) | Original (ppb) | Added (ppt) | Found (ppb) | Recovery (%) | RSD (%) |
|---|---|---|---|---|---|
| Tap water 1 | ND | 1000 | 985.3 | 98.53 | 2.67 |
| Tap water 2 | ND | 500 | 516.9 | 103.38 | 2.12 |
| Tap water 3 | ND | 1000 | 993.4 | 99.34 | 3.54 |
| Tap water 4 | ND | 500 | 489.7 | 97.94 | 3.49 |

ND: not detected.

2.5. Reproducibility and Stability of Modified Electrode

Figure 7B:
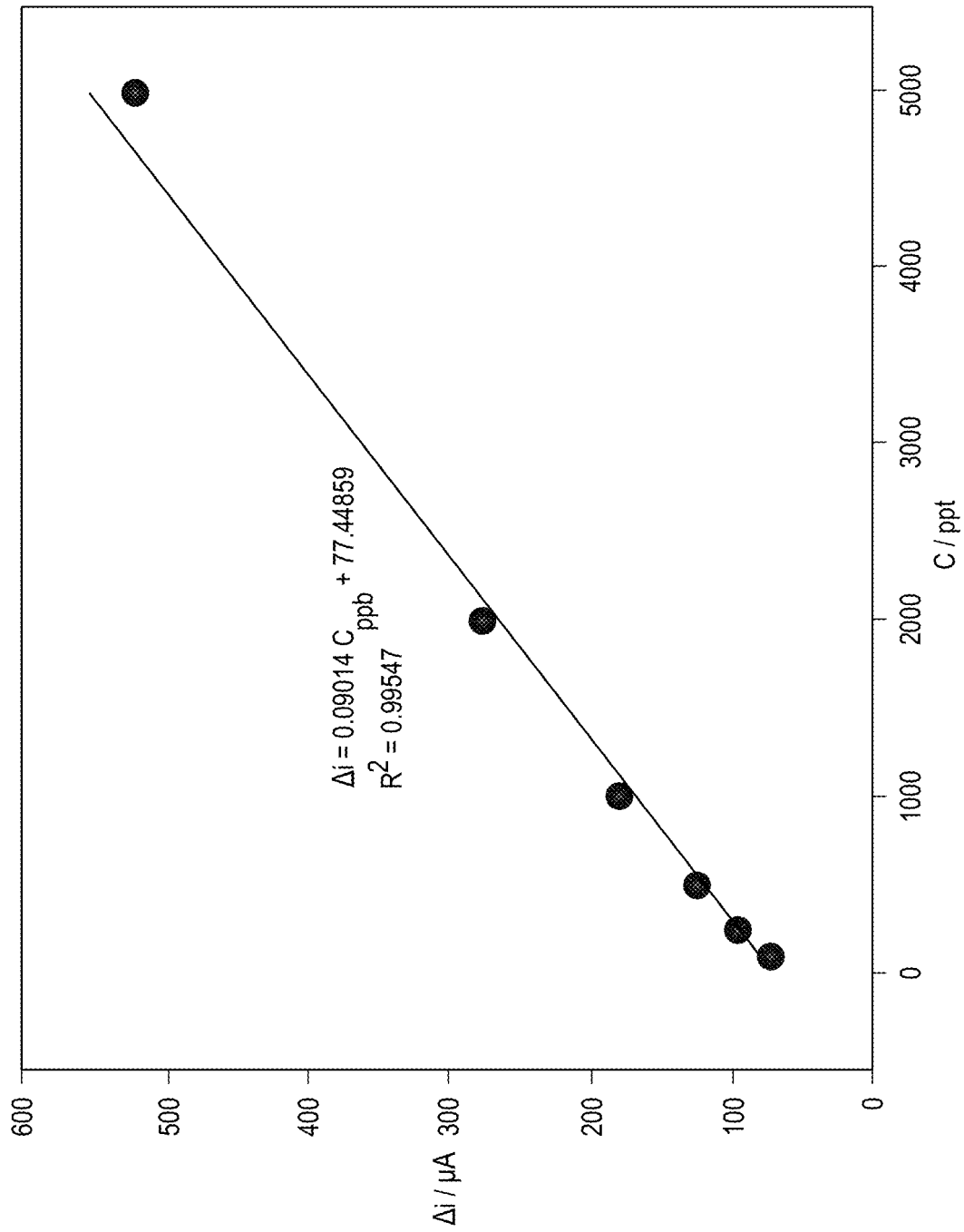

The reproducibility and stability of the stripping current were evaluated under several conditions. As shown in FIG. 7A, the performance on the same solution and the stripping current ratio (% Δi) is 96.85% after 200 consecutive cycles which suggests good stability through frequent use. FIG. 7B shows the repeatability of 5 equally fabricated but different glassy carbon electrodes modified which show an RSD reproducibility variance of 2.44%.

3.0 Other PFAS to which this Method is Applicable

All perfluorocarboxylic acids, PFCAs such as trifluoroacetic acid, TFA; perfluoropropanoic acid, PFPrA; perfluorobutanoic acid, PFBA; perfluoropentanoic acid, PFPA; perfluorohexanoic acid, PFHxA; perfluoroheptanoic acid, PFHpA; perfluorononanoic acid, PFNA; perfluorodecanoic acid, PFDA; perfluoroundecanoic acid, PFUnA; perfluorododecanoic acid, PFDoA; perfluorotridecanoic acid, PFTrDA; and perfluorotetradecanoic acid, PFTA; sulfonated PFAS (poly- and perfluoroalkyl compounds) such as perfluorohexanosulfonic acid, PFHxS; perfluorobutanosulfonate, PFBS; perfluorooctanosulfonate, PFBS; N-methyl perfluorooctanesulfonamidoacetic acid, NMeFOSAA; N-ethyl perfluorooctanesulfonamidoacetic acid, NEtFOSAA; and fluorinated phenols such as pentafluorophenol, PFPh.

Figure 8A:
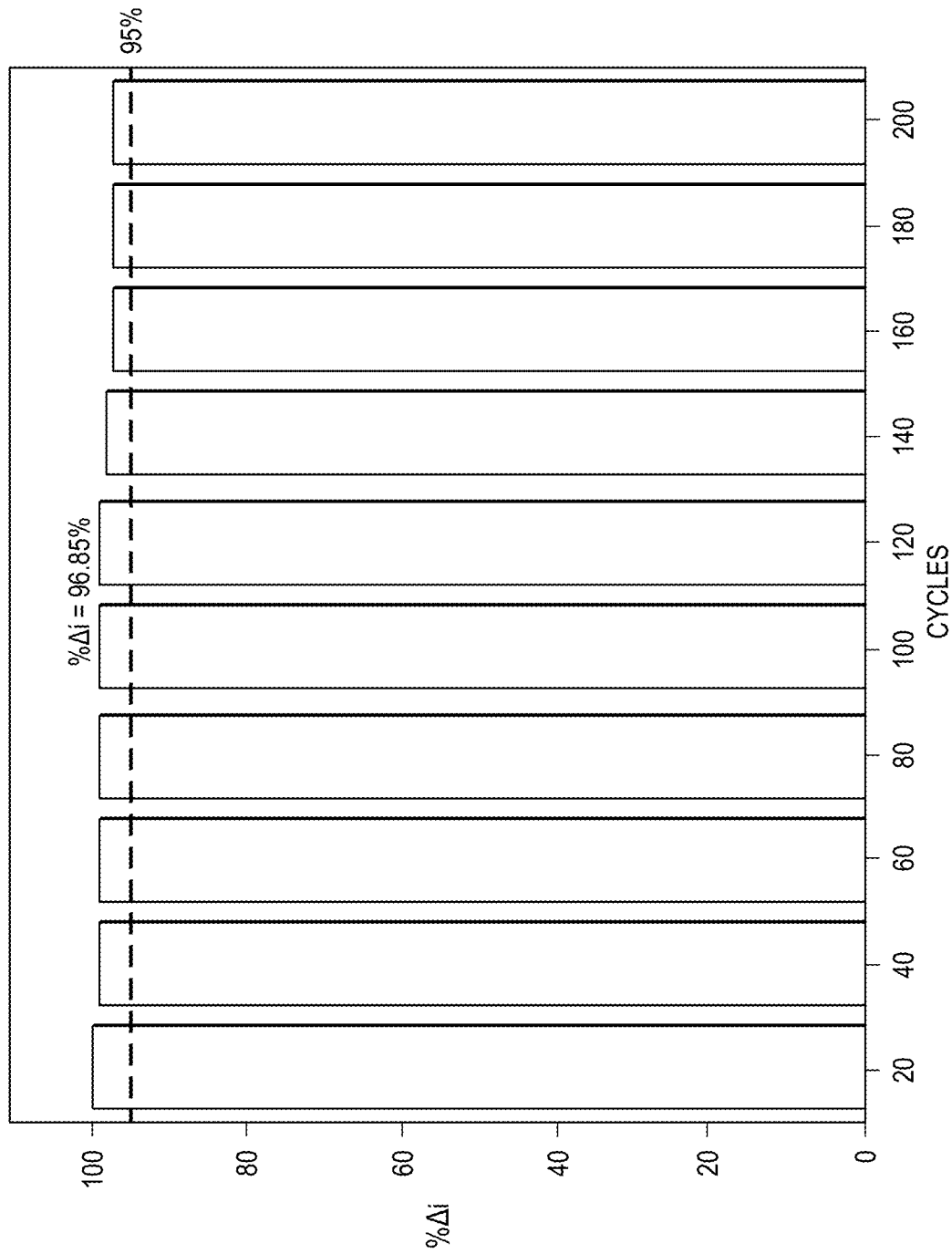
FIGS. 8A-8B illustrate SW-AdCSV response of 5000 ppt PFOA+0.1 M ABS pH 5 at of AuNPs/glassy carbon electrode prepared by chronoamperometry using $t_d$=15 s and $E_d$=-0.044 V vs. saturated calomel electrode FIG. 8A) variation of $\Delta$i throughout 200 cycles of sensing FIG. 8B) responses of $\Delta$i with five different electrodes modified with the same procedure.
Figure 8B:
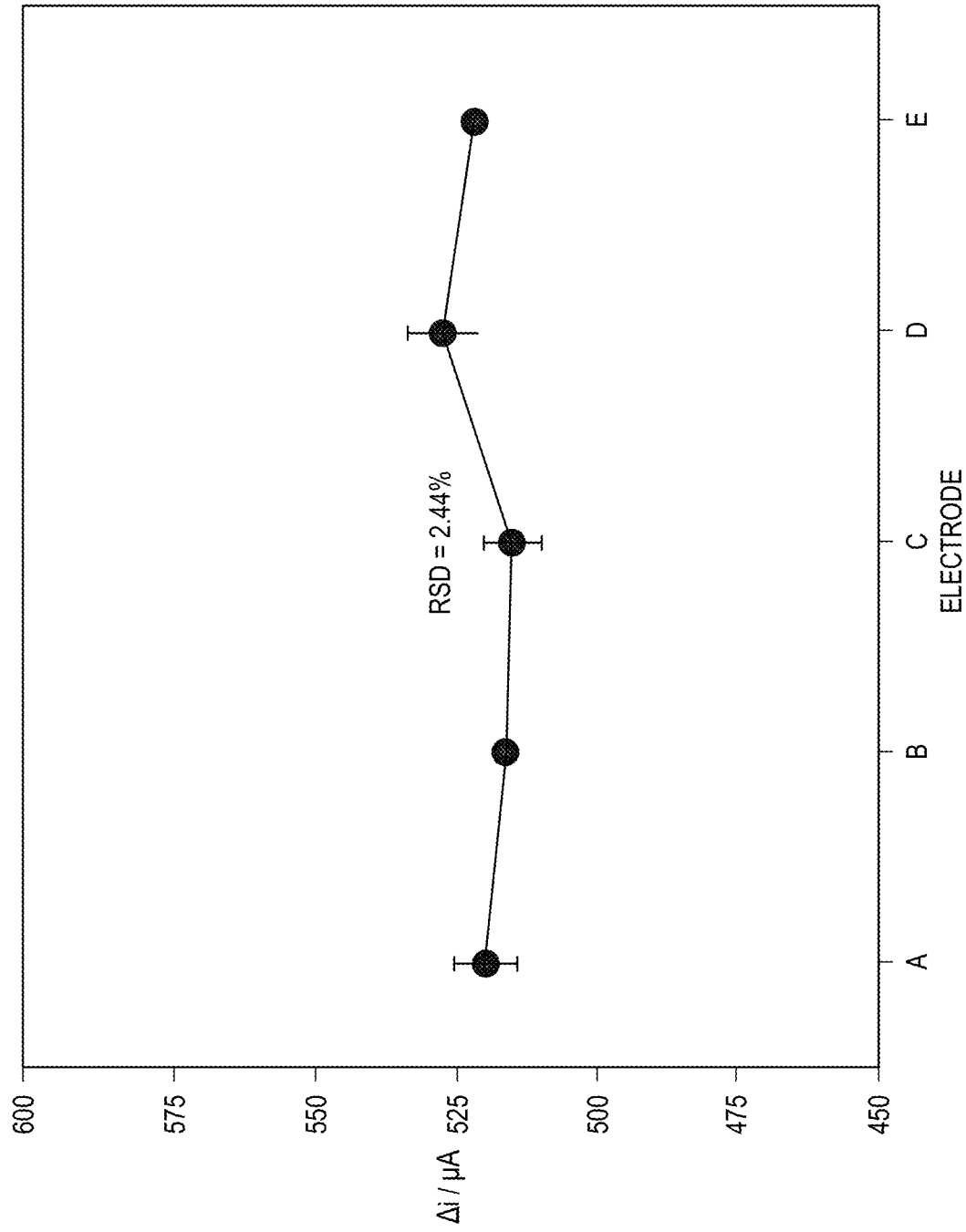
Figure 9:
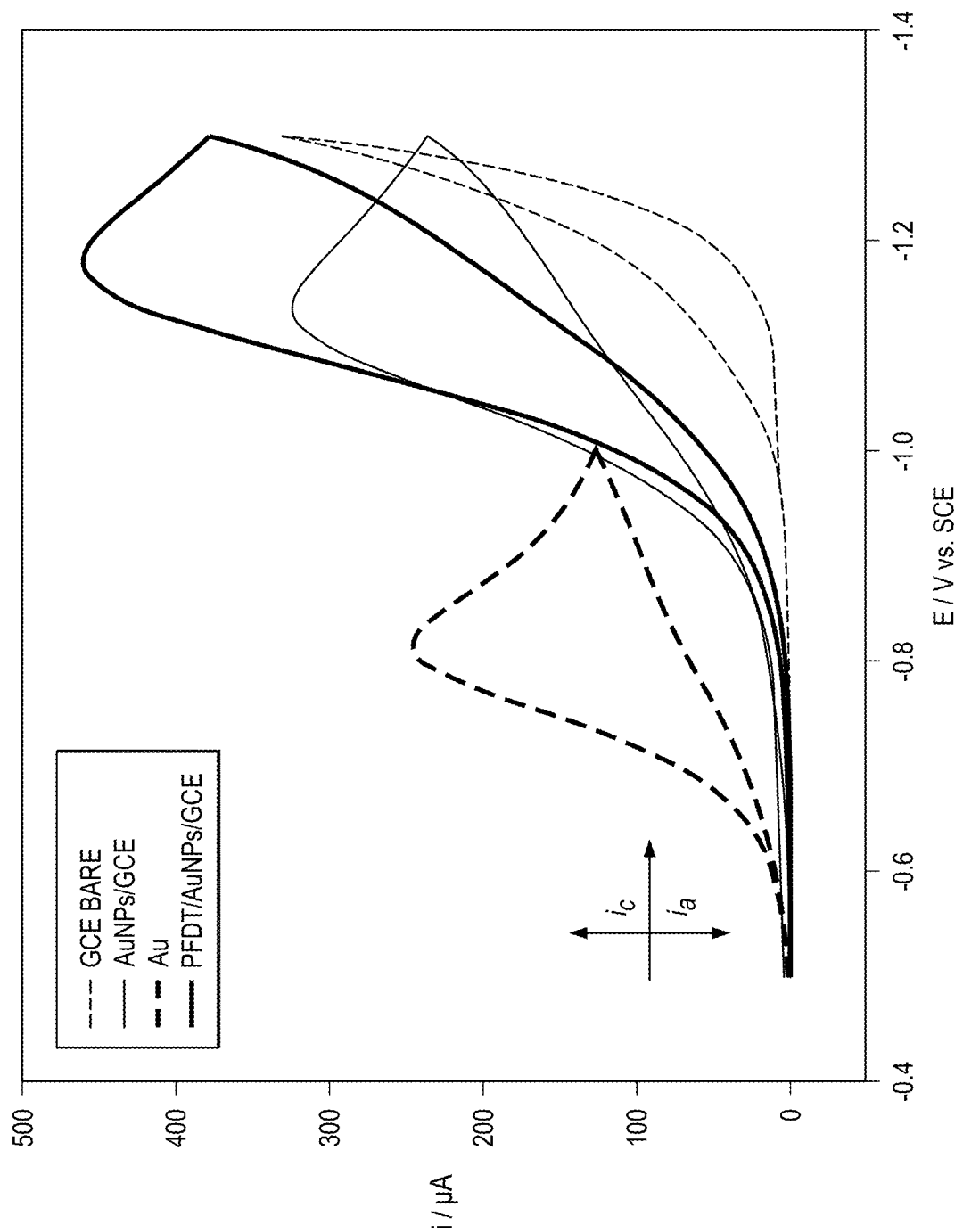
FIG. 9 illustrates the CV response of 1000 ppt PFOA+0.1 M KCl (pH 7.0) at bare, AuNPs, Au and PFDT/AuNPs glassy carbon electrodes. v=100 mV s$^{-1}$, $\varphi$=3 mm.
Figure 10:
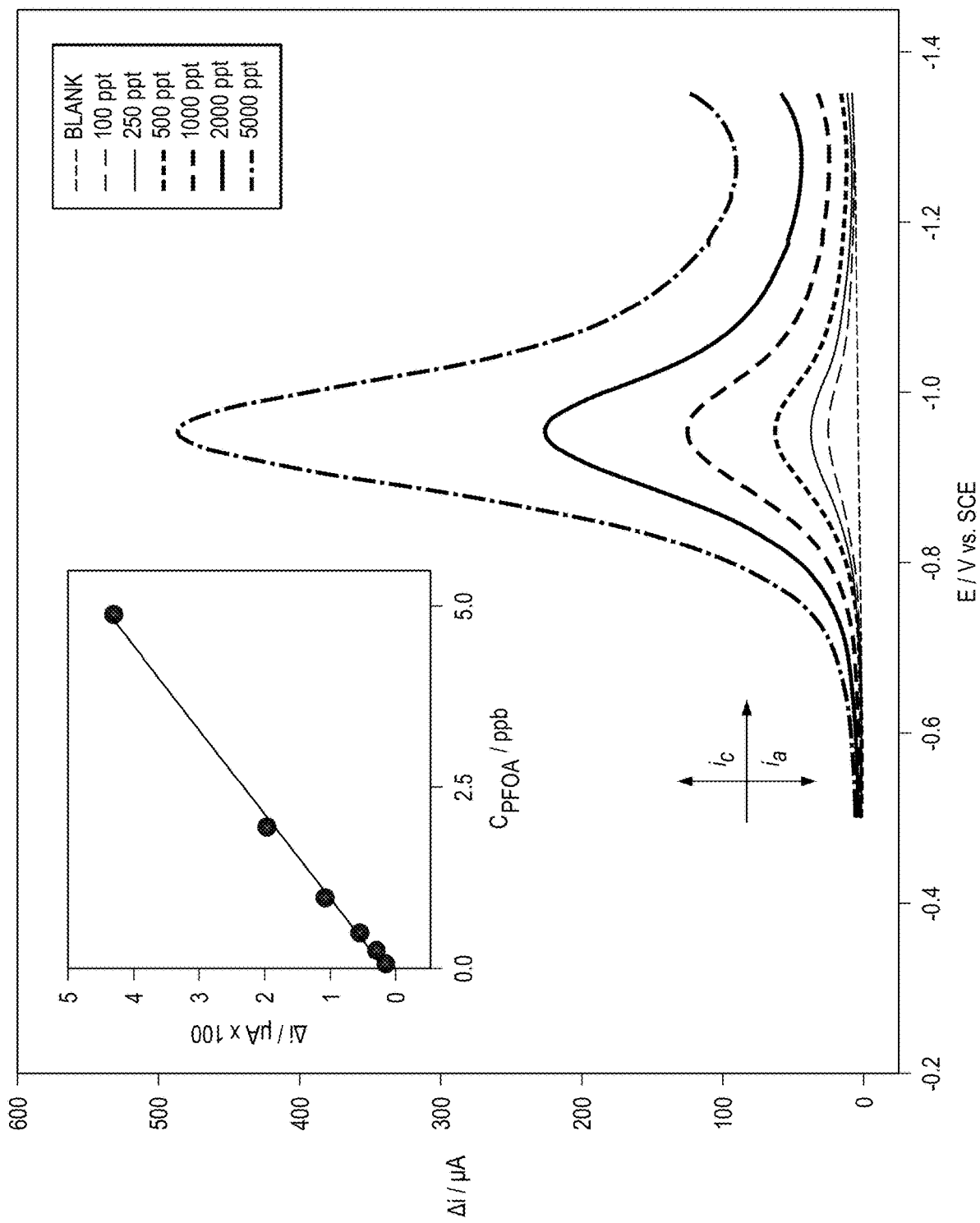
FIG. 10 illustrates SW-AdCSV of PFDT/AuNPs/GCE in 0.1 M KCl (pH 7.0), effect of the concentration in the $\Delta$i response in a range of 100-5000 ppt. f=20 Hz, $E_{step}$=25 mV, $E_{sw}$=5 mV, $t_{dep}$=45 s. Inset: calibration curve from 100 to 5000 ppt ($\Delta$i=0.0852$C_{ppt}$+16.705, $R^2$=0.99671).
Figure 11B:
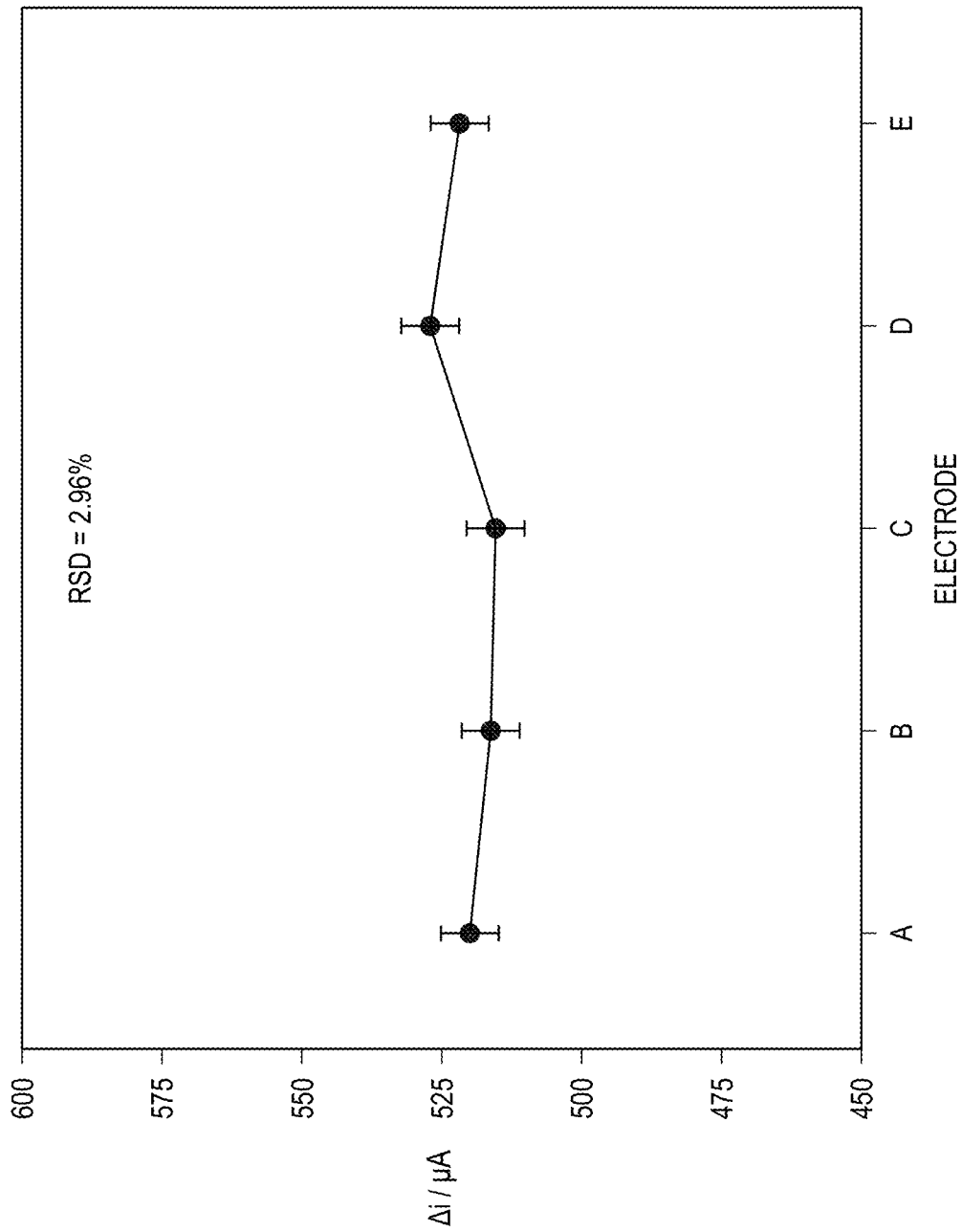
Figure 11C:
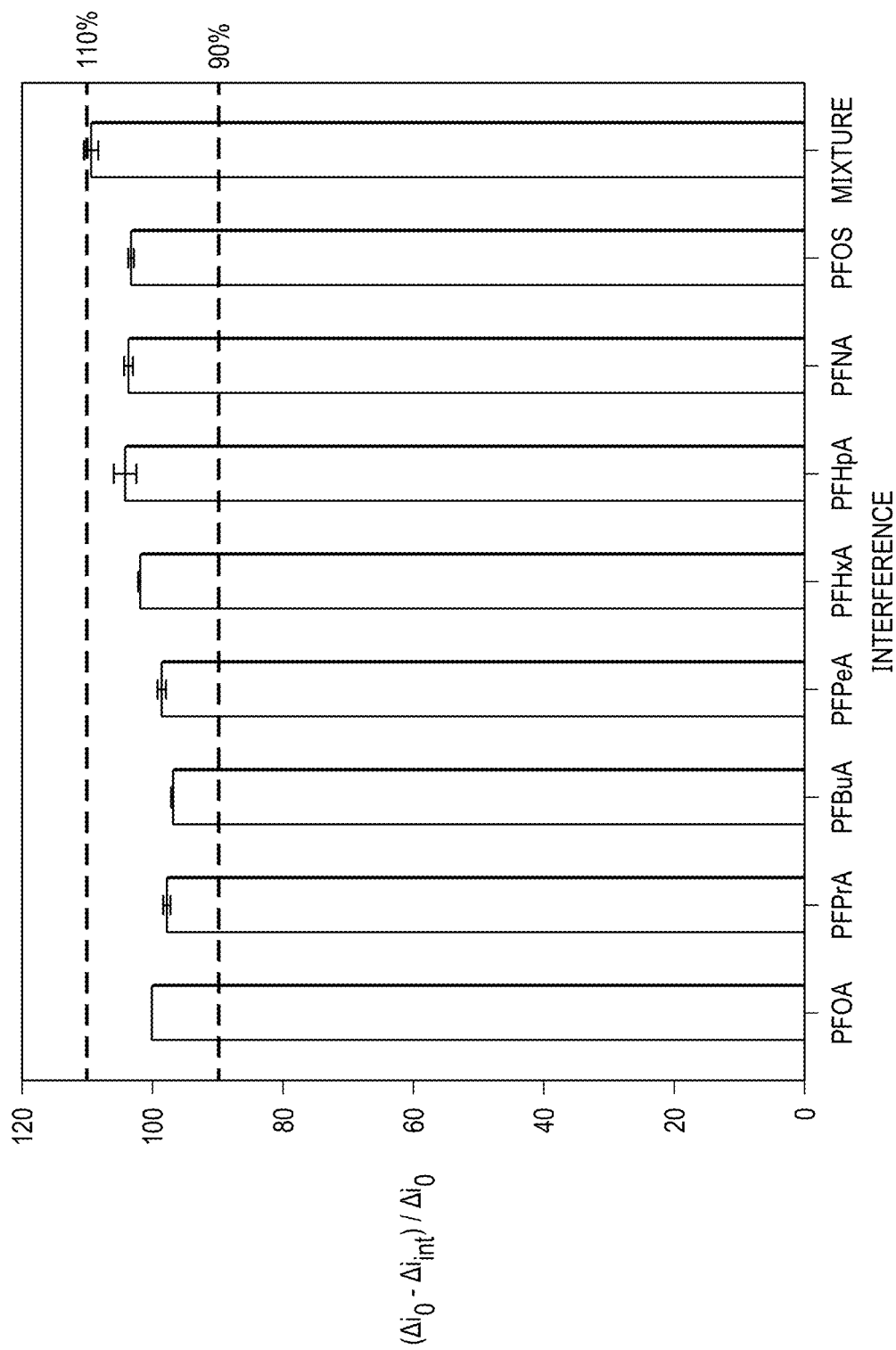
Figure 12A:
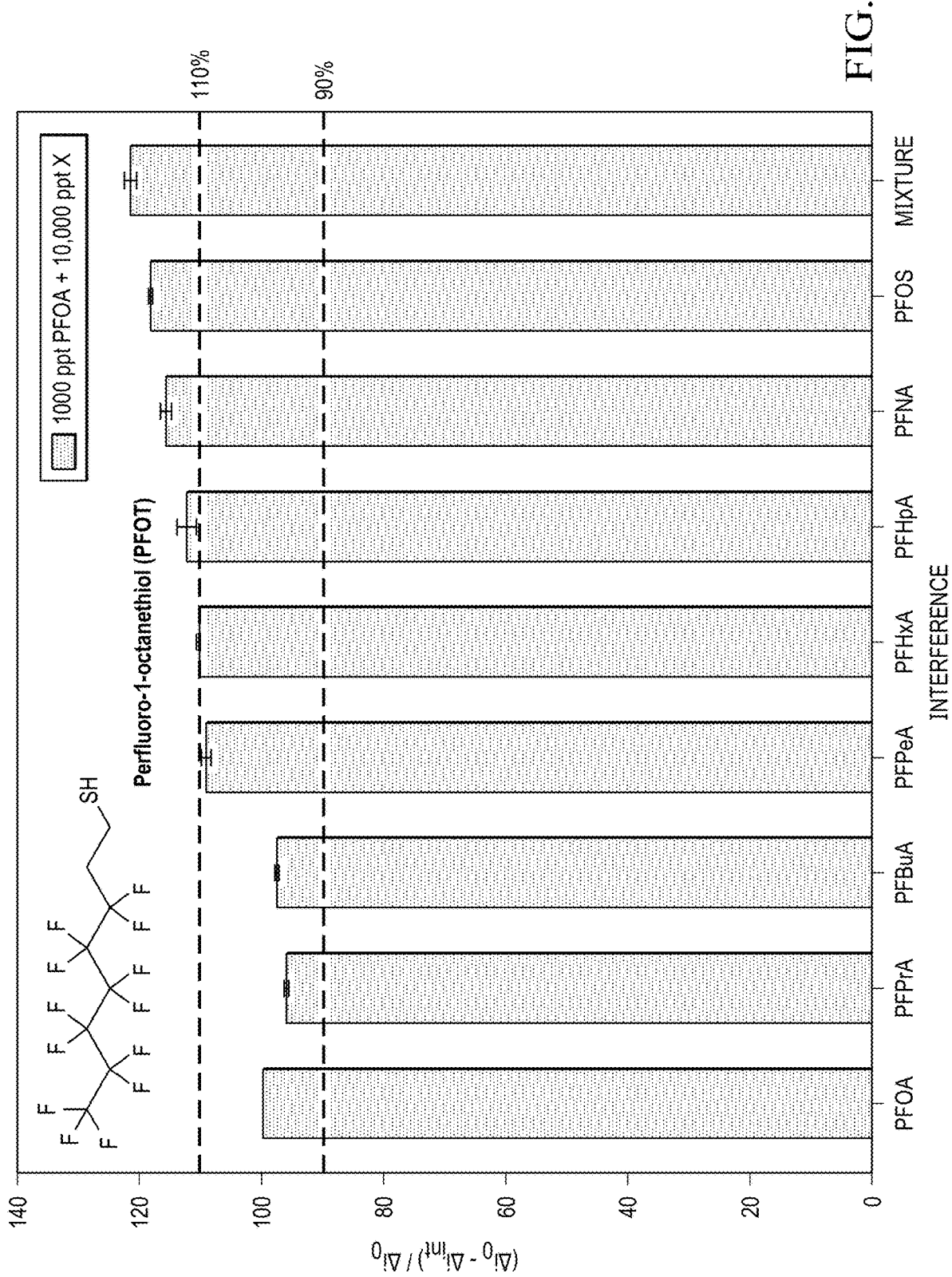
FIG. 12A illustrates effect of the SAM structure in the selectivity with perfluoro-1-octanethiol (PFOT).
Figure 12B:
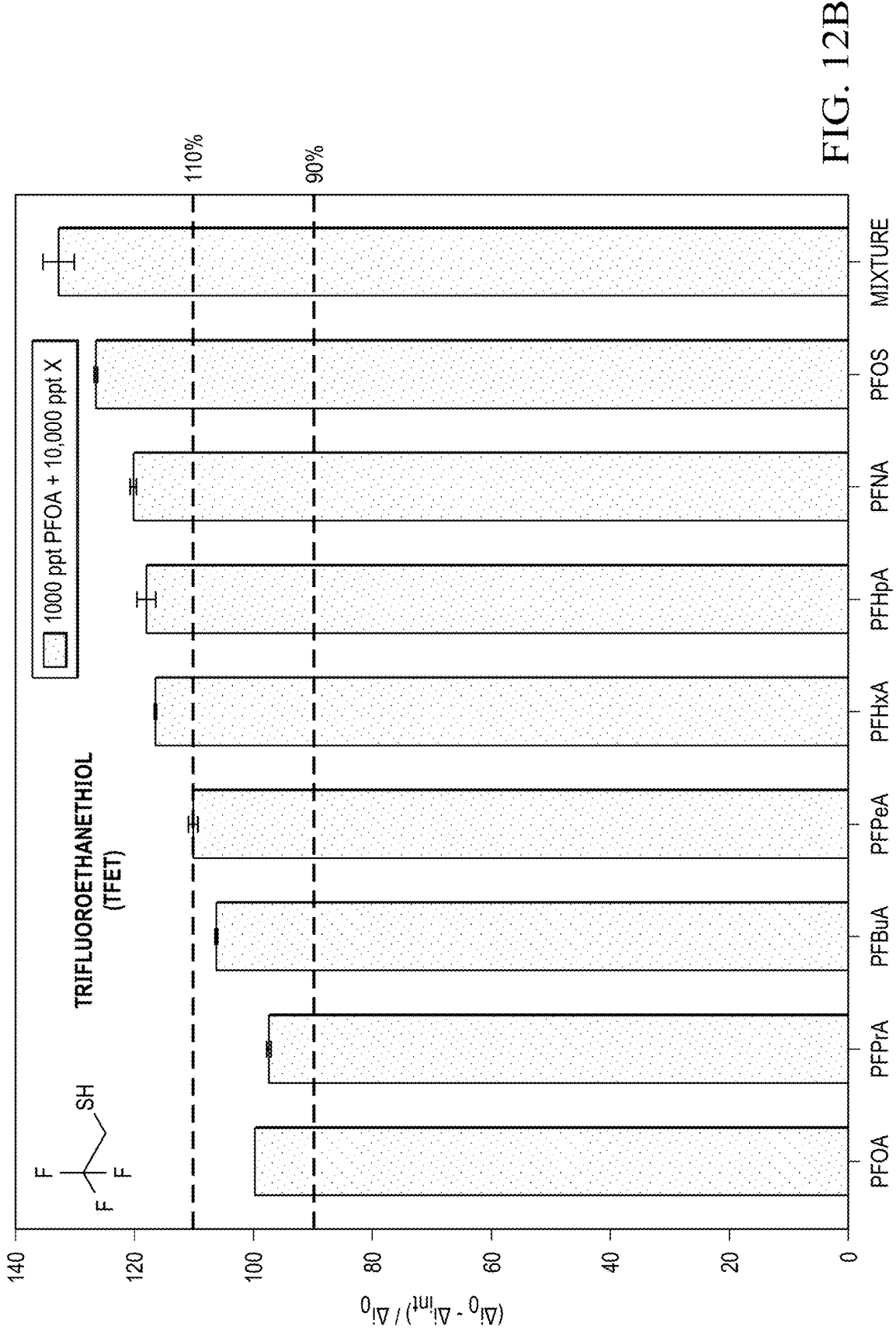
FIG. 12B illustrates effect of the SAM structure in the selectivity with 2,2,2-trifluoroethanethiol (TFET).

FIGS. 8A-8B show SW-AdCSV response of 5000 ppt PFOA+0.1 M ABS pH 5 at of AuNPs/glassy carbon electrode prepared by chronoamperometry using $t_d$=15 s and $E_d$=−0.044 V vs. saturated calomel electrode. FIG. 8A shows the variation of Δi throughout 200 cycles of sensing. FIG. 8B shows responses of Δi with five different electrodes modified with the same procedure.

The term glassy carbon, also called vitreous carbon, is intended to mean a non-graphitized carbon which combines glassy and ceramic properties with those of graphite. It takes its name from its shiny, conchoidal fracture surface, i.e. it looks like glass. Its most important properties are high temperature resistance, extreme resistance to chemical attack, and impermeability to gases and liquids. Glassy carbon is widely used as an electrode material in electrochemistry, as well as for high temperature crucibles. The term approximately is intended to mean within %5 of a value.

EXAMPLES

Specific exemplary embodiments will now be further described by the following, nonlimiting examples which will serve to illustrate in some detail various features. The following examples are included to facilitate an understanding of ways in which embodiments of the present disclosure may be practiced. However, it should be appreciated that many changes can be made in the exemplary embodiments which are disclosed while still obtaining like or similar result without departing from the scope of embodiments of the present disclosure. Accordingly, the examples should not be construed as limiting the scope of the present disclosure.

Examples include combining the AuNPs with at least one of a) perfluoro-1-octanethiol (PFTO), b) 2,2,2-trifluoroethanethiol (TFET) and/or c) perfluorodecanethiol (PFDT). An example includes electrochemical and surface characterization of PFTO/AuNPs/GCE. The electrochemical characterization of the AuNPs electrodeposited in the glassy carbon electrode (GCE) was performed by cyclic voltammetry (CV) and linear sweep voltammetry (LSV). According to the morphology observed in SEM micrographs, a spherical shape was considered, resulting in a surface coverage ($\theta$) of 39.11%±1.95%, was calculated. The $\theta$ obtained is similar to other GCE modified via chronoamperometry (CA), in a range of 35-42% at similar experimental deposition conditions. SEM-EDX analyses were used to characterize the microscopic structure of the electrodeposited AuNPs and the AuNPs/GCE decorated with the SAM of perfluorodecanethiol (PFDT). Homogeneous coverage and high distribution of AuNPs is observed in the surface of the GCE indicating that AuNPs are highly dispersed with minimal agglomeration. The calculated average size of AuNPs of 16 nm±7 nm and a density of 386±24 nanoparticles per $\mu m^2$ was obtained using the observed hemispherical AuNPs shape. The EDX spectra exhibits signals for carbon, gold, and fluorine evidencing the presence of the PFDT on the electrode. Elemental mapping reveals a uniform dispersion of fluorine throughout the surface.

ATR FT-IR spectra of the AuNPs/GCE surface decorated with PFDT is shown in FIG. 1d. The GCE bare and AuNPs/GCE show no signal in the IR windows, the PFDT/AuNPs/GCE shows peaks in vibrations comparable to PFOA, due to its similar structure. The band at approximately 1245 $cm^{-1}$ is associated to C—F bond vibration, the bands at 1229 $cm^{-1}$ and 1145 $cm^{-1}$ were assigned to stretching vibrations of —$CF_2$ and —$CF_3$ groups, respectively.[29]

The surface coverage ($\Gamma^*$) of the PFDT self-assembled monolayer attached to AuNPs/GCE was determinate by CV. PFDT onto the AuNPs/GCE surface presents a broad cathodic peak at −1.19 V vs. SCE, with high capacitive current suggesting the presence of chemisorbed PFDT species. A second cycle shows the absence of the same cathodic peak which confirms the stripping of PFDT from the AuNPs/GCE surface. For comparison, PFDT deposited onto an Au macroelectrode shows a small cathodic peak at −1.4 V vs. SCE. The integration of this peak results in a charge of 1.86 $\mu C$ equivalent to $2.72 \times 10^{-10}$ mol $cm^{-2}$. On the other hand, the integration of the PFDT/AuNPs/GCE yields a charge of 2.36 $\mu C$, which corresponds to $3.46 \times 10^{-10}$ mol $cm^{-2}$ of surface coverage. The higher $\Gamma^*$ for the PFDT/AuNPs/GCE suggests that the PFDT adsorption is more favorable into the gold nanoparticles. The optimization of SAM coverage is a top coverage of $6.71 \times 10^{-10}$ mol $cm^{-2}$.

TABLE 4

Recovery data for PFOA standard addition in tap and brackish water samples using PFDT/AuNPs/GCE

| Sample (PFOA) | Original (ppt) | Added (ppt) | Found (ppt) | Recovery (%) | RSD (% |
|---|---|---|---|---|---|
| A | ND | 2000 | 1930 | 96.5 | 2.36 |
| B | ND | 500 | 523 | 104.6 | 2.96 |
| C | ND | 100 | 96.4 | 96.4 | 3.42 |
| D | ND | 2000 | 1976 | 98.8 | 3.85 |
| E | ND | 500 | 486 | 97.2 | 3.06 |
| F | ND | 100 | 105 | 105 | 3.89 |

Samples A, B and C: Tap water
Samples D, E and F: Brackish water
ND: Not detected, n = 10.

Electrochemical methods are often not selective since they measure $\Delta i$ at specific potentials and can easily interfere with quantification if their reduction potentials are close to those of the target analyte. To avoid this, we added a self-assembled monolayer (SAM) of a perfluorinated thiol to the surface of our AuNPs, namely PFDT/AuNPs/GCE to enhance the molecular recognition of PFOA. To measure this molecular recognition, in the presence of interfering species, we performed a series of analytical PFOA quantification measurements with a variety of different perfluorocarboxylic acids (PFCAs). FIG. 4c shows the analytical interference results of quantification of PFOA in the presence of 10-fold concentrations of the interfering species. The PFDT/AuNPs/GCE shows a recovery percentage ($\Delta i_0 - \Delta i_{int})/\Delta i_0$) within 100±5% of the expected PFOA $\Delta i_0$ response for all interfering matrices. The selectivity of PFDT/AuNPs/GCE toward PFOA was also tested in a mixture of all nine tested PFCAs, and the results show a recovery ($\Delta i_0 - \Delta i_{int})/\Delta i_0$) within 100±10% of the expected PFOA current response. These results show that the presence of interfering PFCAs (and PFOS) do not significantly affect the statistical recovery data and confirm that PFDT/AuNPs/GCE is a selective electrode for PFOA sensing. Different SAM modifications to the AuNPs with other perfluorinated thiols such as perfluorooctanethiol (PFOT) and 2,2,2-trifluoroethanethiol (TFET), were tested, and their recovery percentage (FIG. S6) are within 100±20% and 100±30%, respectively. The low capacity of these PFOT and TFET modified electrodes for selectively detecting PFOA shows the important role of chemical structure in PFDT for the molecular recognition of PFOA.

Electrode Surface Modification

The glassy carbon electrodes were carefully polished on a cloth-polishing pad for 2 min using 0.3 $\mu m$ and 0.05 $\mu m$ alumina slurry. Between each polishing step the electrodes were washed in DI water for 2 min and in the last step, the electrode was ultrasonicated for 5 min in DI water, then ethanol, and finally acetone. The electrode was dried under $N_2$ atmosphere for 30 seconds. AuNPs were deposited onto GC surface using chronoamperometry (CA) in a work solution of 0.1 M $NaNO_3$ + 0.25 mM $HAuCl_4$. Electrodeposition by CA was performed applying a deposition potential ($E_d$) of −0.044 V vs. SCE for a time deposition ($t_d$) of 15 s. Subsequently, the electrode was subjected to ultrasound in DI water for 2 minutes to remove physiosorbed AuNPs in order to form a strongly stable nanoparticle layer. Thereby the AuNPs/GCE was activated in a 0.5 M $H_2SO_4$ solution by running 20 scans between 0.6 V to 1.6 V vs. SCE (anodic direction) at v=100 mV s$^{-1}$. The SAM was fabricated by the static immersion of the AuNPs/GCE into a 50 mM of the organosulfur compounds (PFDT, PFOT and TFET) in anhydrous ethanol for 12 h at 20° C. Upon removal from solution, the electrodes were thoroughly rinsed with ethanol and acetone to remove the species not chemisorbed.

Selectivity Testing

The selectivity tests were made in 10-fold excess to a standard solution of 1000 ppt PFOA in 0.1 M KCl (pH 7.0), the PFCAs: perfluoropropanoic acid (PFPrA), perfluorobutanoic acid (PFBA), perfluoropentanoic acid (PFPeA), perfluorohexanoic acid (PFHxA), perfluoroheptanoic acid (PFHA), perfluorononanoic acid (PFNA) and Perfluorooctanesulfonic acid (PFOS) were used. All reagents from Sigma-Aldrich. The effect of the interferences was expressed in percentage ($\Delta i_0 - \Delta i_{int})/\Delta i_0$) through normalizing the stripping currents of the PFOA in absence ($\Delta i_0$) and presence ($\Delta i_{int}$) of the interfering PFCAs.

Table 5 shows an exemplary brackish water composition.

TABLE 5

Recovery data for brackish water composition based on standards by NSF/ANSI 61-2016.

| General parameters | Specification |
|---|---|
| Water source | De-ionized water (Conductivity <1 μS cm$^{-1}$) |
| pH adjusted with HCl | 8.0 ± 0.25 |
| Temperature | 20 ± 2.5° C. |

| Constituents | Concentration (mg L$^{-1}$) | Concentration (mM) |
|---|---|---|
| Bicarbonate ($HCO_3^-$, initial) | 244 | 4.0 |
| Calcium ($Ca^{2+}$) | 120 | 3.0 |
| Chloride ($Cl^-$) | 1203 | 33.9 |
| Magnesium ($Mg^{2+}$) | 49 | 2.0 |
| Silica ($SiO_2$) | 20 as $SiO_2$ | 0.33 |
| Sodium ($Na^+$) | 750 | 32.6 |
| Sulfate ($SO_4^{2-}$) | 194 | 2.0 |
| Total Dissolved Solid (TDS) | 2586 | — |
| Ionic strength | — | 49 |

The concentrations are achieved by adding the following to deionized water:
  1690 mg L$^{-1}$ NaCl (99.0%, Sigma-Aldrich)
  487 mg L$^{-1}$ $MgSO_4 \cdot 7H_2O$ (98%, Fisher)
  440 mg L$^{-1}$ $CaCl_2 \cdot 2H_2O$ (99%, Fisher)
  336 mg L$^{-1}$ $NaHCO_3$ (99%, Sigma-Aldrich)
  95 mg L$^{-1}$ $Na_2SiO_3 \cdot 9H_2O$ (98%, Fisher) Table 6 shows an exemplary drinking water (tap water) composition.

TABLE 6

Recovery data for drinking water composition based on standards by NSF/ANSI 61-2016.

| General parameters | Specification |
|---|---|
| Water source | De-ionized water (Conductivity <1 μS cm$^{-1}$) |
| pH adjusted with HCl | 7.25 ± 0.25 |
| Temperature | 20 ± 2.5° C. |

TABLE 6-continued

Recovery data for drinking water composition based on standards by NSF/ANSI 61-2016.

| Constituents | Concentration (mg L$^{-1}$) | Concentration (mM) |
|---|---|---|
| Bicarbonate ($HCO_3^-$, initial) | 183 | 3.0 |
| Calcium ($Ca^{2+}$) | 40 | 1.0 |
| Chloride ($Cl^-$) | 71 | 2.0 |
| Fluoride ($F^-$) | 1 | 0.053 |
| Magnesium ($Mg^{2+}$) | 12 | 0.50 |
| Nitrate ($NO_3^-$) | 8.9 (2.0 as N) | 0.14 |
| Phosphate ($PO_4^{3-}$) | 0.12 (0.04 as P) | 0.0013 |
| Silica ($SiO_2$) | 20 as $SiO_2$ | 0.33 |
| Sodium ($Na^+$) | 89 | 3.86 |
| Sulfate ($SO_4^{2-}$) | 48 | 0.50 |
| Total Diss, Solid (TDS) | 478 | — |
| Ionic strength | — | 8.5 |

The concentrations are achieved by adding the following to deionized water:
  252 mg L$^{-1}$ $NaHCO_3$ (99%, Sigma-Aldrich)
  147 mg L$^{-1}$ $CaCl_2 \cdot 2H_2O$ (99%, Fisher)
  124 mg L$^{-1}$ $MgSO_4 \cdot 7H_2O$ (98%, Fisher)
  95 mg L$^{-1}$ $Na_2SiO_3 \cdot 9H_2O$ (98%, Fisher)
  12 mg L$^{-1}$ $NaNO_3$ (99%, Sigma-Aldrich)
  2.2 mg L$^{-1}$ NaF (99%, Sigma-Aldrich)
  0.18 mg L$^{-1}$ $NaH_2PO_4 \cdot H_2O$ (98%, Fisher)

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, and the practical applications, and to enable others of ordinary skill in the art to understand the disclosure for various embodiments with various modifications as are suited to the particular use contemplated.

What is claimed is:

1. A method of electrochemical sensing, comprising:
   providing an electrochemical sensor comprising a glassy carbon substrate and gold nanoparticles located on a surface of the glassy carbon substrate; and
   sensing electrochemically a compound selected from the group consisting of polyfluoroalkyl compounds or perfluoroalkyl compounds using the electrochemical sensor.

2. The method of claim 1, wherein the compound is perfluorooctanoic acid (PFOA).

3. The method of claim 1, wherein sensing electrochemically comprises square wave cathodic stripping voltammetry.

4. The method of claim 1, wherein the electrochemical sensor has, for a concentration of perfluorooctanoic acid in aqueous media, a relative standard deviation range of from approximately 2.36% to approximately 3.08%.

5. The method of claim 1, wherein the electrochemical sensor has, for perfluorooctanoic acid in aqueous media, a limit of detection of approximately 0.228 ppb and a limit of quantification of approximately 0.759 ppb.

6. The method of claim 1, wherein the compound is located in an aqueous media.

7. The method of claim 1, wherein the compound comprises at least one perfluorocarboxylic acid.

8. The method of claim 7, wherein the compound comprises at least one member selected from the group consisting of trifluoroacetic acid, TFA; perfluoropropanoic acid, PFPrA; perfluorobutanoic acid, PFBA; perfluoropentanoic acid, PFPA; perfluorohexanoic acid, PFHxA; perfluoroheptanoic acid, PFHpA; perfluorononanoic acid, PFNA; perfluorodecanoic acid, PFDA; perfluoroundecanoic acid, PFUnA; perfluorododecanoic acid, PFDoA; perfluorotridecanoic acid, PFTrDA; and perfluorotetradecanoic acid, PFTA.

9. The method of claim 1, wherein the compound comprises at least one sulfonated polyfluoroalkyl compound or at least one sulfonated perfluoroalkyl compound.

10. The method of claim 9, wherein the compound comprises at least one member selected from the group consisting of perfluorohexanosulfonic acid, PFHxS; perfluorobutanosulfonate, PFBS; perfluorooctanosulfonate, PFBS; N-methyl perfluorooctanesulfonamidoacetic acid, NMeFOSAA; N-ethyl perfluorooctanesulfonamidoacetic acid, NEtFOSAA; and fluorinated phenols such as pentafluorophenol, PFPh.

11. The method of claim 1, wherein providing the electrochemical sensor comprises providing at least one member selected from the group consisting of perfluoro-1-octanethiol (PFTO), 2,2,2-trifluoroethanethiol (TFET) or perfluorodecanethiol (PFDT) on the surface of the glassy carbon substrate.

12. An article of manufacture, comprising:
an electrochemical sensor comprising
a glassy carbon substrate having a surface and
a plurality of gold nanoparticles coupled to the surface of the glassy carbon substrate,
wherein the plurality of gold nanoparticles is coupled to the surface of the glassy carbon substrate at a density of approximately $174\pm07$ $\mu m^{-2}$.

13. The article of manufacture of claim 12, wherein the plurality of gold nanoparticles have an average diameter of from approximately $14\pm06$ nm to approximately $16\pm07$ nm.

14. The article of manufacture of claim 12, wherein the electrochemical sensor has, for a concentration of perfluorooctanoic acid in aqueous media, a relative standard deviation range of from approximately 2.36% to approximately 3.08%.

15. The article of manufacture of claim 12, wherein the electrochemical sensor has, for perfluorooctanoic acid in aqueous media, a limit of detection of approximately 0.228 ppb and a limit of quantification of approximately 0.759 ppb.

16. An article of manufacture, comprising:
an electrochemical sensor comprising
a glassy carbon substrate having a surface;
a plurality of gold nanoparticles coupled to the surface of the glassy carbon substrate; and
at least one member selected from the group consisting of perfluoro-1-octanethiol (PFTO), 2,2,2-trifluoroethanethiol (TFET) or perfluorodecanethiol (PFDT) coupled to the surface of the glassy carbon substrate.

* * * * *